US007822634B2

(12) United States Patent (10) Patent No.: US 7,822,634 B2
McCall (45) Date of Patent: Oct. 26, 2010

(54) WORK ROLE YIELDS MANAGEMENT SYSTEM AND METHOD

(76) Inventor: Danny McCall, 142 Oonoga Way, Loudon, TN (US) 37774

( * ) Notice: Subject to any disclaimer, the term of this patent is extended or adjusted under 35 U.S.C. 154(b) by 0 days.

(21) Appl. No.: 11/772,026

(22) Filed: Jun. 29, 2007

(65) Prior Publication Data

US 2008/0059291 A1 Mar. 6, 2008

Related U.S. Application Data

(60) Provisional application No. 60/806,145, filed on Jun. 29, 2006.

(51) Int. Cl.
*G06F 11/34* (2006.01)
(52) U.S. Cl. ...................................................... 705/11
(58) Field of Classification Search ............... 705/7, 705/11
See application file for complete search history.

(56) References Cited

U.S. PATENT DOCUMENTS

2002/0046074 A1* 4/2002 Barton ........................... 705/8
2002/0055870 A1* 5/2002 Thomas ....................... 705/10
2006/0116894 A1* 6/2006 DiMarco ....................... 705/1

OTHER PUBLICATIONS

McCall, Danny, Career Fulcrum—The Basics, Version 6 Perfect Agent, 2001.*
Extract From Career Fulcrum Series PerfectAgent, 2001.*
Talentsphere.com Web Pages 2001, Retrieved from Archive.org Jun. 10, 2008.*
Talentsphere.com Web Pages 2000, Retrieved from Archive.org Jun. 10, 2008.*
McCall, Danny, Career Fulcrum—The Basics—vol. I Perfect Agent, Version 6, Digital Discovery, Inc., 2001.*
McCall, Danny; Career Fulcrum vol. 1: The Basics, 2001, Knoxville, TN, US.
McCall, Danny; Career Fulcrum vol. 1: The Basics, 2002, Knoxville, TN, US.
McCall, Danny; Career Fulcrum vol. 1: The Basics, 2003, Knoxville, TN, US.
McCall, Danny; Career Fulcrum vol. 2: The Field Guide, 2001, Knoxville, TN, US.
McCall, Danny; Career Fulcrum vol. 2: The Field Guide, 2002, Knoxville, TN, US.
McCall, Danny; Career Fulcrum vol. 2: The Field Guide, 2003, Knoxville, TN, US.
McCall, Danny; Career Fulcrum vol. 3: Personal Marketing Programs, 2001, Knoxville, TN, US.
McCall, Danny; Career Fulcrum vol. 3: Personal Marketing Programs, 2002, Knoxville, TN, US.
McCall, Danny; Career Fulcrum vol. 3: Personal Marketing Programs, 2003, Knoxville, TN, US.

(Continued)

*Primary Examiner*—Scott L Jarrett
(74) *Attorney, Agent, or Firm*—W. Edward Ramage

(57) ABSTRACT

A system and method to diagnose, design, deploy, and manage a work role in the context of the complex modern relationship or affiliation existing between the organization and worker. Universally applicable organizing principles, process and software are combined to make a practical approach to the diagnostics, design and deployment of work roles inclusive of worker/talent relations, and predictably determine, reveal probabilities, address causation factors and uncover issues that may lead to success, failure, remedy or improvement in forming and maintaining productive, mutually-satisfying work role relations.

15 Claims, 28 Drawing Sheets

OTHER PUBLICATIONS

McCall, Danny; Career Fulcrum vols. 1-3, 2004 Knoxville, TN, US.

McCall, Danny; Career Fulcrum Work Role Mastery Series, 2004, Knoxville, TN, US.

McCall, Danny; Career Fulcrum Series 3—The Personal Triangle, 2004, Knoxville, TN, US.

McCall, Danny; Career Fulcrum Illuminations—112—The Personal Triangle, Feb. 2005, Knoxville, TN, US.

McCall, Danny; Career Fulcrum Illuminations—121—The Organizational Triangle, May 2005, Knoxville, TN, US.

McCall, Danny; Career Fulcrum Illuminations—121—Personal Value Proposition, May 2005, Knoxville, TN, US.

McCall, Danny; Career Fulcrum Illuminations—132-1—Bringing It Together, May 2005, Knoxville, TN, US.

McCall, Danny; Career Fulcrum Illuminations—132-2— Economics of Work Roles, May 2005, Knoxville, TN, US.

McCall, Danny; Career Fulcrum Illuminations—132-3—Rethinking and Remodeling Compensation, May 2005, Knoxville, TN, US.

McCall, Danny; Career Fulcrum Illuminations—132-4— Introducing the Bow Tie, May 2005, Knoxville, TN, US.

McCall, Danny; Career Fulcrum Illuminations—211—Personal Work Role Mastery, Jul. 2005, Knoxville, TN, US.

McCall, Danny; Career Fulcrum Illuminations—231—The Eight Dimensions, Jul. 2005, Knoxville, TN, US.

McCall, Danny; Career Fulcrum Illuminations—232—Choice Predictability and Relationship Performance, Aug. 2005, Knoxville, TN, US.

McCall, Danny; Bringing It Together, February 2005, Knoxville, TN, US.

McCall, Danny; Quick Reference Cards, 2001, Knoxville, TN, US.

* cited by examiner

WORK ROLE YIELDS MANAGEMENT SYSTEM AND METHOD

This application claims benefit of, and priority to, U.S. Provisional Patent Application No. 60/806,145, filed Jun. 29, 2006, entitled "WORK ROLE YIELDS MANAGEMENT SYSTEM AND METHOD." The specification, drawings, attachments, exhibits, and complete disclosure of U.S. Provisional Patent Application No. 60/806,145 are incorporated herein by specific reference.

FIELD OF INVENTION

This invention relates to a system and method for the management and handling of work roles and work relationships by individuals and employers. More particularly, this inventions relates to a system and method regarding diagnostics, design, deployment, management, and continuous improvement of a work role in response to the inherent complex nature of the modern relationship or affiliation existing between the organization and worker.

BACKGROUND OF INVENTION

The workplace affiliation between an organization and its workers (or the employer and its employees) during much of the industrial age was generally based upon models that can be loosely referred to respectively as paternalism (employer) and loyalty (employee). This model of affiliation has substantially shifted over the last decades, due to variety of societal and economic reasons, to an affiliation based more severely and purely upon the value or yields each party gains, or expects to gain, from the relationship.

However, each party determines and defines the value they seek with significant, if not total, difference. In other words, though successful work relations are based upon each party's reciprocal gain, there are disparate requirements from each party that must be satisfied to form and sustain successful workplace relations. These generally symbiotic relations include severely contrasting requirements of each party that are multi-faceted, some being absolute in nature while others are relative to other options each party may possess at any given moment. Typically the requirements of both parties are fluid and changing with the passage of time.

Formal and mutually compatible perspectives and a responsive means to apply them are sorely missing from organizational method and practice, and equally from personal literacy in today's workplace. Accordingly, what is needed is a comprehensive system and method to diagnose, design, deploy, and manage a work role in the context of the complex modern relationship or affiliation existing between the organization and worker.

SUMMARY OF INVENTION

In one exemplary embodiment, universally applicable organizing principles, process and software are combined to make a practical approach to the diagnostics, design and deployment of work roles inclusive of worker/talent relations. As a result of the methodical application of these components, it is possible to predictably determine, reveal probabilities, address causation factors and uncover issues that may lead to success, failure, remedy or improvement in forming and maintaining productive, mutually-satisfying work role relations. The present invention offers utility and value to organizational design, leadership, management and recruitment directed to the purpose of gaining optimal yields from each work role inclusive of addressing worker relations needs that reside within each work role. It offers equal utility and value to workers for career management and personal betterment in seeking and succeeding in work roles so as to realize optimal gain and fulfillment. It offers to both parties a universal basis of shared perspective leading to betterment of communications, the realization of respective needs and expectations and a reliable path to formation, maintaining, remedies, improvements and terminations of affiliation.

In one exemplary embodiment, the invention comprises the following universal, mutually compatible organizing principles and processes:

A. A macro-means that defines, structures and instructs thought regarding the interrelated personal (worker) qualities and requirements regarding work roles (the Personal Triangle). These include parameters of functional qualities and requirements, parameters of social and inter-relational qualities and requirements, and parameters of life effects qualities and requirements (upon and from work).

B. A macro-means that defines, structures and instructs thought regarding the interrelated organizational qualities and requirements regarding a work role (the Organizational Triangle). These include parameters of investment returns, outcomes, output or yields (requisite functions to generate each yield; requisite worker capabilities to perform each function; and requisite conditions to realize and sustain optimal worker performance); parameters of allocated resources and investments, inclusive of time (requisite organization requirements to utilize the worker); and parameters of acceptable and unacceptable risks.

C. A meta-means to integrate these two respective structures into one greater and holistic model, so as to encompass a complete model or synthesis mapping of a worker's life with an embedded work role that occupies a portion of that life (simplified and flat: the Bowtie or with greater specificity and fidelity to workplace realities: the Nested 3D). This provides both parties with greater understanding, empathy and responsiveness to each other's needs as well as provide the basis of a "common language" for improved communications.

D. A means of comparing personal and organizational quality and requirement parameters to as to inform and instruct appraisal, career-related decisions, communications/information exchange and work role remedies or improvements for the worker (the Personal Work Role Experience . . . an assessment, audit and diagnostic instrument or utility).

E. A means of comparison of the personal and organizational quality and requirements parameters so as to inform and instruct organizational appraisal, decisions and deployment of a work role, inclusive or worker specifications, relations stewardship, communications/information exchange recruitment and selection activities (yields optimization diagnostics and design inclusive of The Personal Experience of Role Functional Satisfaction—PERFS—an assessment, audit and diagnostic instrument or utility).

F. An aggregate means to precipitate thought and assist the two parties in negotiating, adjusting, modifying and improving their relationship arrangement in eight commonly shared dimensions or continuums, which are a part of work relations: the affiliation construct; the operation context; the attention construct; the partition construct; the participation construct; the motivation construct; the application construct; and the localization construct.

G. A linear process to consider, investigate or diagnose a work role and apply the derivative information and knowledge to design and instruct deployment of that work role, including metrics therein, followed by deployment/execution of the work role with monitoring/observation and measurement in a manner so as to accumulate an increase in knowledge for application in improvement of the work role by repeating the process, so as to form a cycle which can be continued indefinitely (the Cycle of Knowledge).

Based on the above, another exemplary embodiment of the present invention comprises a derivative means to instruct and enable the betterment of front line management and talent relations stewardship including repair (Talent Stewardship Framework). Other embodiments include a derivative means to instruct and enable the betterment of seeking, informing, information gathering and selecting new workers; a derivative means to compare new worker selection information in a manner of linear study against subsequent worker performance to as to improve the work role design in its worker specification and selection parameters; a derivative means for an organization to precipitate greater innovation and generate more ideas from workers, including vetting thereof, through contextual application of Organizational Triangle and Personal Triangle organizing principles; and a derivative means for a worker to gain greater receptivity of their innovations and ideas by an organization by application of the Organizational Triangle organizing principles.

Although it is possible to generate and manage the above information in a manual and physical embodiment, the scope and nature of the work role within most work environments also pragmatically requires contextually designed knowledge management software (rpS&C) configured to encompass all elements of the above, so as to (i) enable the user to enter, document, store, access, manage, configure, and assign any form of alphanumeric or digital data file of any type, so as to be archival repository of contextual data, information and knowledge in keeping with the above mentioned structure and principles; (ii) provide for contextual placement of each element of data, information and knowledge so as to be aligned with the before mentioned structures, principles and their inherent attributes (Slates™); (iii) provide for the assignment of attributes to each element of data, information or knowledge so as to provide for identification of a wide range of relational factors within work roles in keeping with the above structure, the needs of work environments and to provide further information for computing software utility, processing, compiling and applications of algorithms (Smart Labels™); and (iv) provide for a variety of software functions and utilities in composing, reporting, designing and configuring in regards to work role information, data/information visualization or presentation (Composers) and continuing knowledge management of the work role (Work Role Knowledge Management)

DETAILED DESCRIPTION OF THE INVENTION

The present invention relates to a system and related methods for the management and handling of work roles and work relationships by various entities, including, but not limited to, individual workers, candidates for employment, employers, recruiters, management, human resource departments, and the like.

Figure 1:
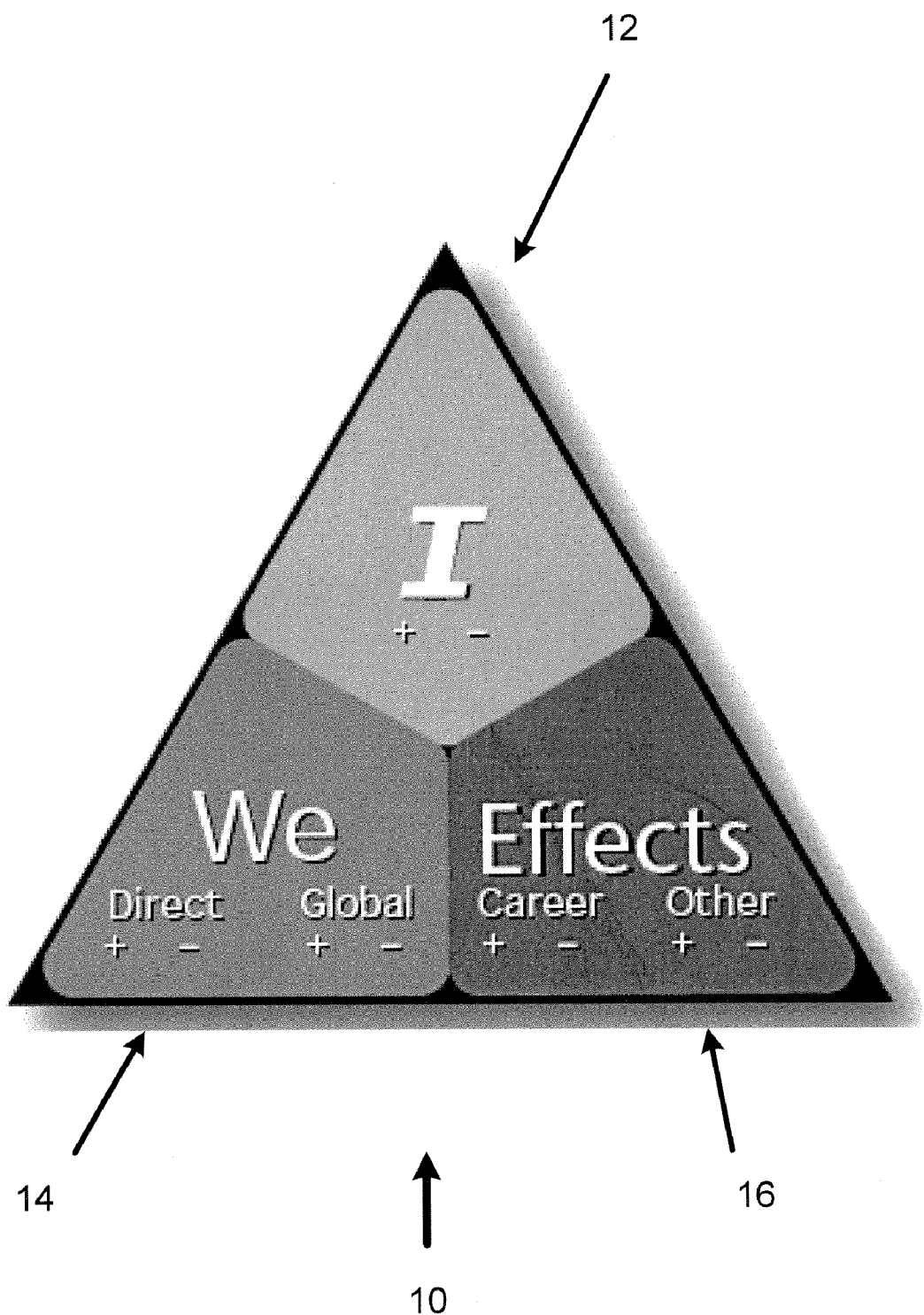
FIG. 1 is a diagram of a Personal Triangle framework in accordance with one embodiment of the subject invention.

FIG. 1 shows a framework for a "Personal Triangle" 10 that defines, structures, and instructs thought regarding interrelated personal qualities and requirements with regard to work roles. FIG. 1 shows a flat view of the Personal Triangle, with three primary areas or "corners" relating to work and career. The three primary corners of a Personal Triangle framework in the figure are equal in size to reflect their equal importance regarding the individual and his or her work. It is possible for the areas to vary in size in other exemplary embodiments.

In one particular embodiment, the apex of the triangle comprises the "I" area 12, which includes how and what an individual provides, performs, produces and operates within his or her work role's central function and purpose. This area comprises the direct personal and intimate elements of the individual's work function as related to the activities within and around a particular role. These are the portions of tasks, production, experiences, education, skills, crafts, personality, capabilities, tendencies, preferences and immediate work environment attributes that pertain to your "personal" responsibilities, functions and accountability. This corner relates to the "center of gravity" of work role performance, and may be seen as the reason for the role's very existence. Therefore, the "I" area represents the central capabilities and qualities that the individual brings to a role, as well as the central aspects of what that individual does in the work role.

The "I" area also is used to describe what one desires in compensation for his or her functional performance, such as in those extrinsic and intrinsic rewards that are totally personal, intimate and immediate in context (such as meeting a sales quota, seeing a finely-crafted machined tool in use that was just produced, or seeing the sparkle of new understanding in a student's eyes). This is the area of the "hands-on" and "mind-engaged" aspects of one's work. The "I" area also includes the qualities, behaviors, thinking styles, actions, values, ethics, aversions, inhibitions, known shortcomings or liabilities and aspirations that the individual possesses, related to his or her direct, personal work role functions. It may further include areas of requisite, desired or needed personal development, experience, education or training required for the individual to better perform the role's function. This is the place to be used to describe all elements that are part of who the individual is and what the individual seek, as they are specific to the individual in his or her work role.

A second corner of the Personal Triangle comprises the "We" area 14, which includes the considerations formed by the community, ecosystem, social factors, and environmental factors of the work role and life at work. This area comprises the relationships, infrastructure, industry, profession and facilities that are part of the roles in which the individual participates—the people one works with, the teams one belongs to, the teams and processes one is part of, the way one is trained, equipped and supported, and the social dynamics unique to each. These "We" elements may be seen, in one exemplary embodiment, as what "surrounds" or what is "peripheral" to the work role.

Alternatively, the "We" area may be viewed metaphorically as the "screenplay" in which the role resides, the "cast" that surrounds the role, and the "set and stage" that is its platform and backdrop. Most roles relate to other people that are within their own roles, including associates, managers, leaders, followers, customers, competitors, vendors and various others. This area is where one describes the companions and types of associations one desires and does not desire in his or her role(s).

The "We" area also may relate to greater work community, its purpose, and culture. This corner is one of many degrees and layers, for most roles are immersed in a variety of immediate interaction and communities, and those typically reside within greater ones, such as departments and divisions. Those often reside within those still greater, such as industries, professions, marketplaces and so on. Roles interrelate, interact, are interdependent and are a part of something greater; thus, this area can be extremely important. In fact, often the "sense of purpose" of one's work may ultimately reside here, for one's role may be one of many that together accomplish objectives and a mission far greater than any one person could achieve. This is a reason people "organize" and have "organizations." This "social factor" allows us to have the specialization in work roles that are orchestrated, choreographed and managed together for a greater purpose.

The third corner of the Personal Triangle comprises the "Effects" area 16, which is shaped by the other parts, priorities and influences of the balance of one's life external to work roles and the workplace. This area is where the individual considers his or her career and other domains of life, for both may be larger than any given work role or workplace. These effects include the people and life qualities that are special to the individual and the effects the individual wants his or her work to have or not have on them. "Effects" are external and peripheral to the role, yet they are important in that they inevitably impact, or are impacted, influence, or are influenced, by the roles one chooses. Every role has an effect on one's future, one's quality of life and the people that are special such as family and friends, and vice-versa. It is essential to define, appreciate and give appropriate attention to the forces and factors that not only affect one's work but are also affected by work.

Any one of the corners on its own is a powerful means to open the door to greater self-appraisal. It may also be evident that each corner presents an incomplete perspective if the other corners are not considered in balance with careful, inevitable and intelligent compromises.

The Personal Triangle is flexible. The Personal Triangle is not a rigid construct that demands literal or exacting interpretation of anyone's words and thoughts. It does not impose hard or severe rules. The Personal Triangle is "guiding knowledge" to enlighten and direct the individual's thought. The Personal Triangle is a framework to form and make its structure suitable to individual purposes and needs. Each area that it creates is real and universal. Where one draws the lines, how strictly individuals define their meaning and how they are used, is up to each user to decide for himself or herself. In fact, where and why an individual places something in the Personal Triangle carries with it its own special meaning. A classic example of this is financial compensation. A commissioned sales person may place their commission in the "I" area since this is a direct measurement of them to role production (i.e. in real estate, the "million dollar producer"), while others may place their income in the "We" area because they get competitive satisfaction or consider it referential to others on their team or profession. And others in an organization may place their salaries in the "Effects" area simply because the money aspect of their role gives them and those they care about the quality of life they desire away from work. Similarly, one can put the same data, information, or consideration in more than one area.

Figure 2:
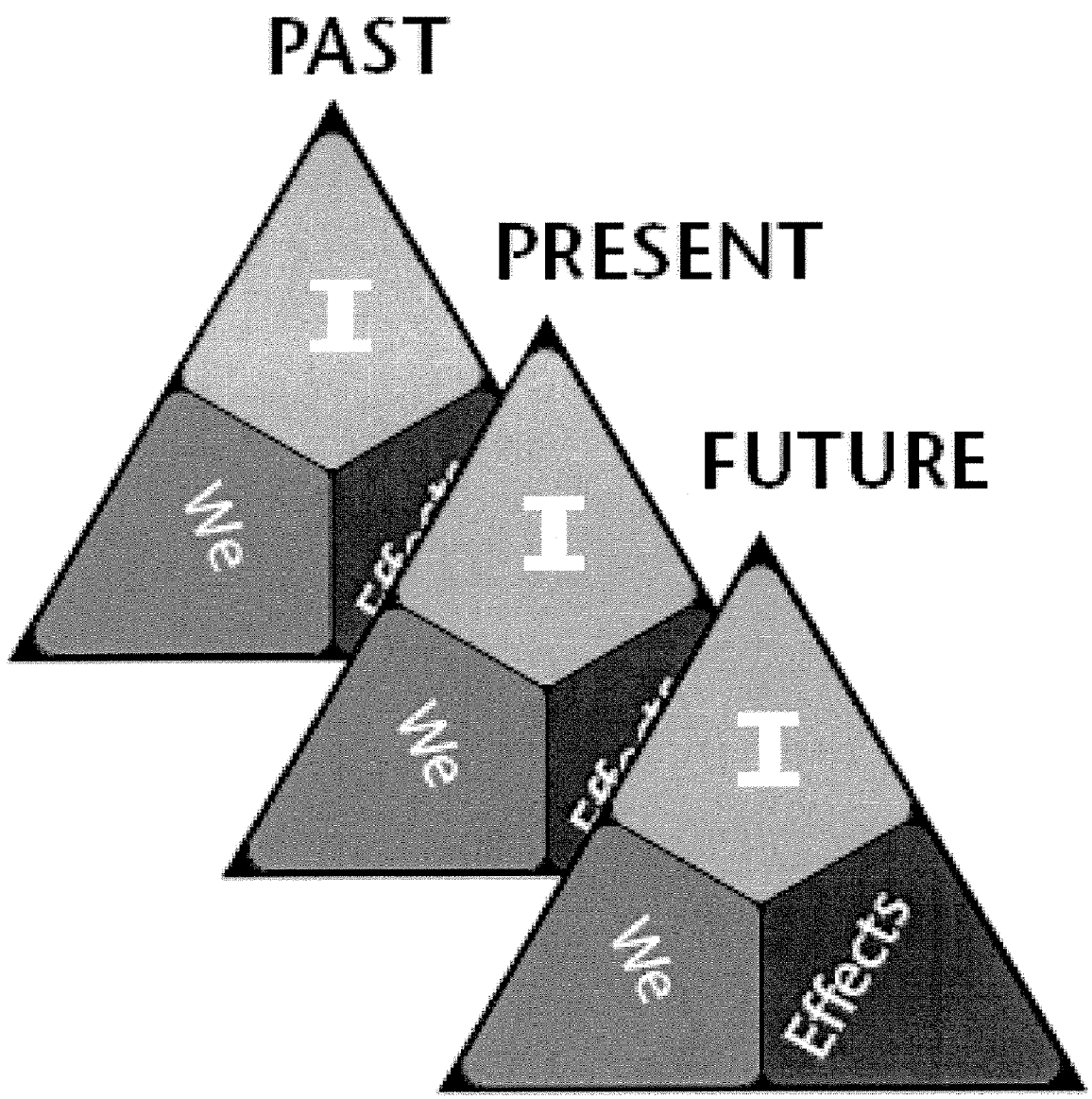
FIG. 2 is an alternative diagram of Personal Triangle frameworks over time in accordance with another embodiment of the subject invention.

Further, as shown in FIG. 2, one's Personal Triangle is not limited to single point in time. Personal Triangles may be considered across time—as shown in FIG. 2, this may include the past, present, and future. One's Personal Triangle can help one assess what has been good and bad, desirable and undesirable, in past and present roles in order to better design a future career.

Figure 3:
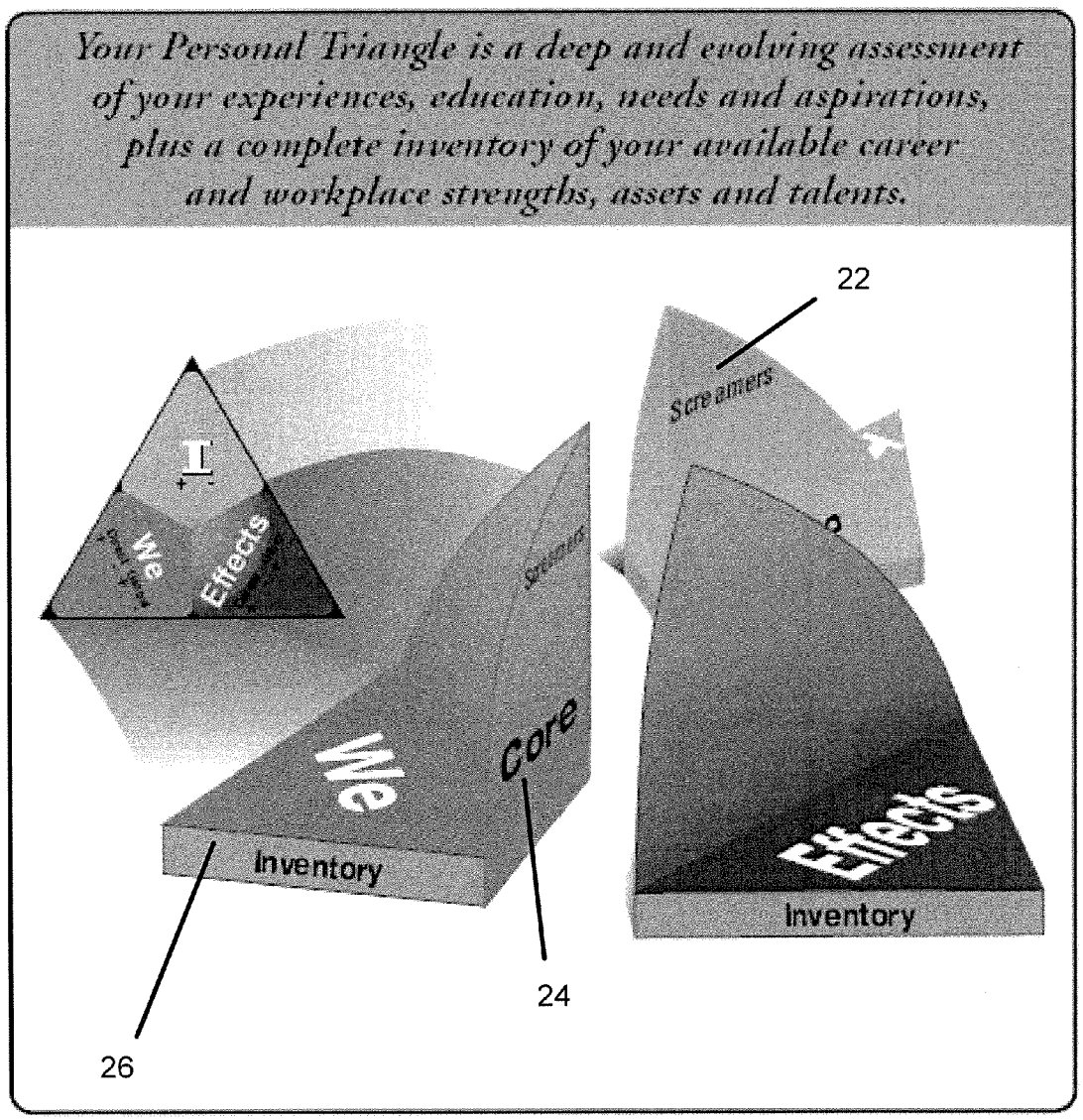
FIG. 3 is a diagram of a Personal Triangle framework in accordance with another embodiment of the subject invention.

The information or items in each area will vary in importance to the individual. As shown in FIG. 3, high priority or items of critical importance (i.e., "screamers") 22 are factors that must be present in one's work role. Secondary "core" factors 24 are those that bear importance to flow and quality of life. And finally, "inventory" 26 comprises everything else in the Personal Triangle. These categories allows the individual to rank and prioritize each item.

Inventory may be thought of as the "general storage area" for the individual and career-related information. This is the base level, the metaphoric cellar, basement or file cabinet where one can place all of the information about qualities and assets. Everything about the individual, work, past work and how one wants life to impact work and vice versa, can reside here. The subtle, forgotten and inconsequential items of the individual at the moment may be here. The items of distant past or distant future may also reside here. Nevertheless, a means for documenting and recording as much information as possible is almost always a good thing, whether or not it is directly relevant to what one does and what one wants to do today. The individual may choose to include awards, patents, publications, performance reviews, testimonials and references, assessments, personal innovations and problems solved. One might include observations about oneself and others such as personalities he or she have worked well or poorly with, or various work environments that have been conducive to your personal performance, satisfaction or dissatisfaction.

This layer can become the archive of personal experiences and information about all the roles one had, the functions performed and the education completed. The inventory layer, by virtue of the Personal Triangle's structure, allows one to span time and document the accumulating wisdom of one's career and life thus far. The inventory layer can be a complete and comprehensive career archive and storehouse, as well as a repository of future dreams and aspirations, to draw from and refer to when things are confusing or one feels lost. Information and data in this area may in some cases be more general in nature, may not be as easily structured or fit neatly in one of the three primary corners.

The "Core" layer is the layer in which one places all the present considerations and related information which have importance to that individual. The core level, when completed and kept up to date, should provide a crystal clear image of the types of roles and functions that are preferred, as well as what the individual presently seeks to avoid. Core elements also relate to that which is important to the individual or an organization in performance of a role. Thus, it includes the pertinent formal and informal education and experiences, as well as skills and competencies a role demands, but also all other aspects needed to make work roles positive for the individual and his or her life around the role. The future dimension of the Core area includes the domains in which one desires to grow, stretch and expand personally, at a future stage of one's career. Much of the Core level's information can be created by looking across the "Inventory" and extracting what is most relevant and pertinent to present needs—whether from the past or aspirations related to the future. On the other hand, some people will start with the Core layer first, and from there take or expand things "downward" to the "inventory" or "upward" to the "Screamers." More resolution and granularity to Core information can be obtained by assigning or establishing a numbering or ranking system to stratify and tier Core information comparatively.

Unlike Inventory information, information within one's Core level should be considered as much as possible within one (or more) of the primary corners of the Personal Triangle 10 (I, We, Effects). Generally, in the beginning, this is done in the present tense. At this level, one should be carefully thinking about what one needs to be present now in work performance and satisfaction. As time passes, much of which is now considered Core-layer needs will simply become items in the Inventory archive (or vice versa), while new things will become Core. The Core layer is the place where one should carefully consider and document all information that is important for that individual to offer to an organization, and equally, to gain from the individual's role.

While Core items are important to the individual, they are usually open to thoughtful and careful negotiation and compromise. This cannot be said for "Screamers."

Screamers, as the name implies, is the topmost layer, and everything that is elected to be placed at this level will be those items that are "essentials," "must haves," "vital criteria," "imperative parameters," "must avoids" and "normegotiables." Just as the Core may be seen as that which "bubbles up" from all that is within the Inventory layers to reflect importance at present, the Screamers can be seen as those things that bubbled up from the Core layer because they hold the greatest and are of the utmost importance to the individual personally at this time. The Screamers are the work-role criteria and requirements that are absolute and rigid in one's present work-role needs. The individual is willing to compromise them only in the most extreme situations. They present the highest order of career concerns that one will not, and generally must not, contradict. Like the Core area, these are often first considered in the present tense.

A way to test if an item is a Screamer is by simply answering the question, "Is this negotiable?" If one can answer yes to this question, it is not actually a Screamer, but instead information or a criterion that should be placed in the Core area. If one will not or cannot compromise or negotiate the item, then it is a Screamer. This important distinction will become vital as one targets the roles one seeks, markets himself or herself, negotiates in the marketplace, or accepts seductive promotions. Also, the Screamers should always be placed in the corner(s) which are best for them. By carefully considering and documenting personal Screamers at this moment in one's career, the individual will be able to avoid bad decisions and be well prepared to make good decisions with predictably positive outcomes.

The Personal Triangle 10 should allow one to think and document in both the "positive" and "negative" space of information. It is important to identify what is and what is not, what one is and what one is not, what one does and what one does not, what one deems to be desirable and what one deems to be undesirable. Each element of the Personal Triangle has a "+" and "−" symbol next to it. This is to remind the user that each is just as important as the other. Giving greater attention to both the positive and negative elements will bring very powerful consequences. It will often help the individual to uncover and reveal important information or patterns occurring in life.

Figure 4A:
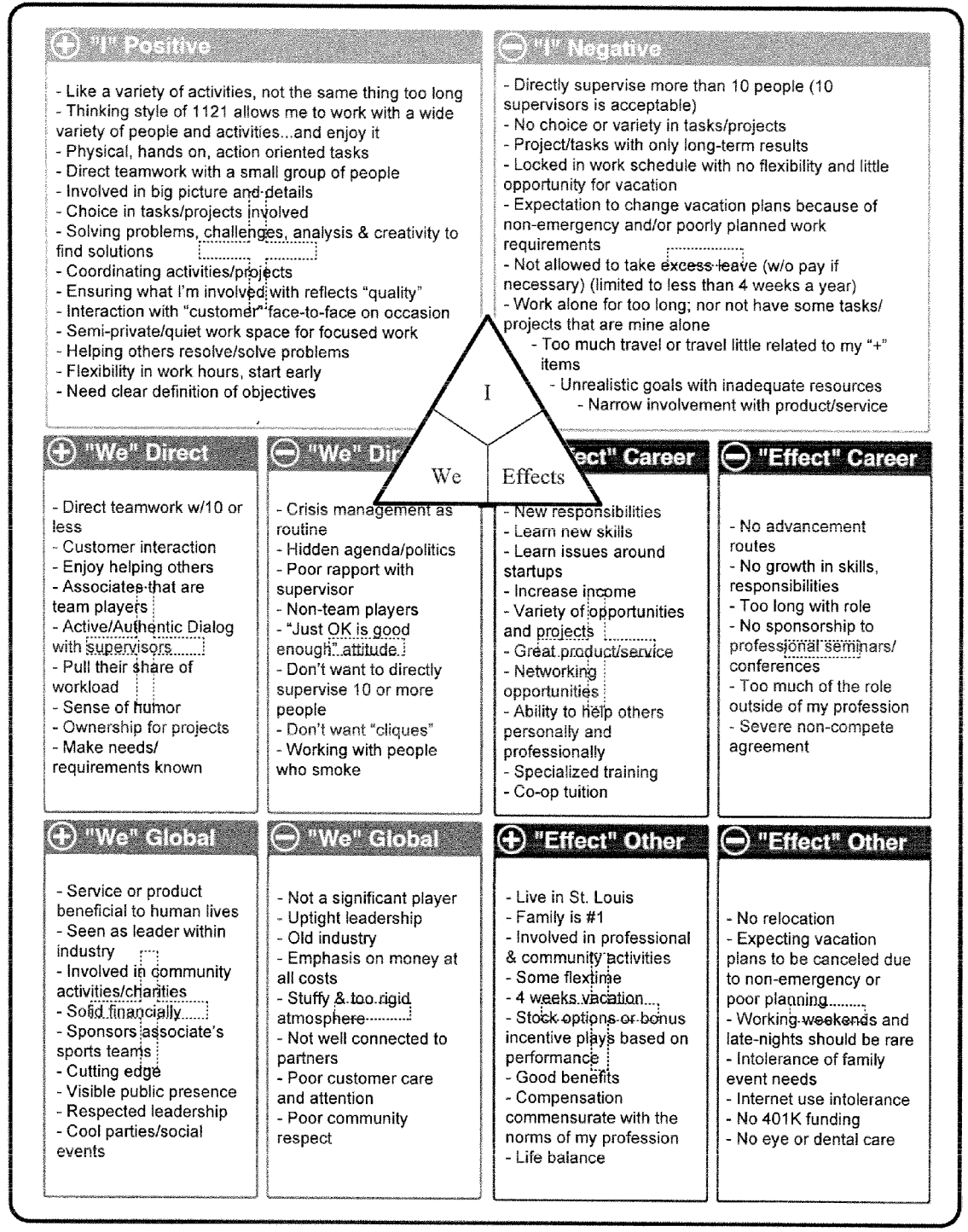
FIGS. 4a-c are diagrams of a Personal Triangle in use.
Figure 4B:
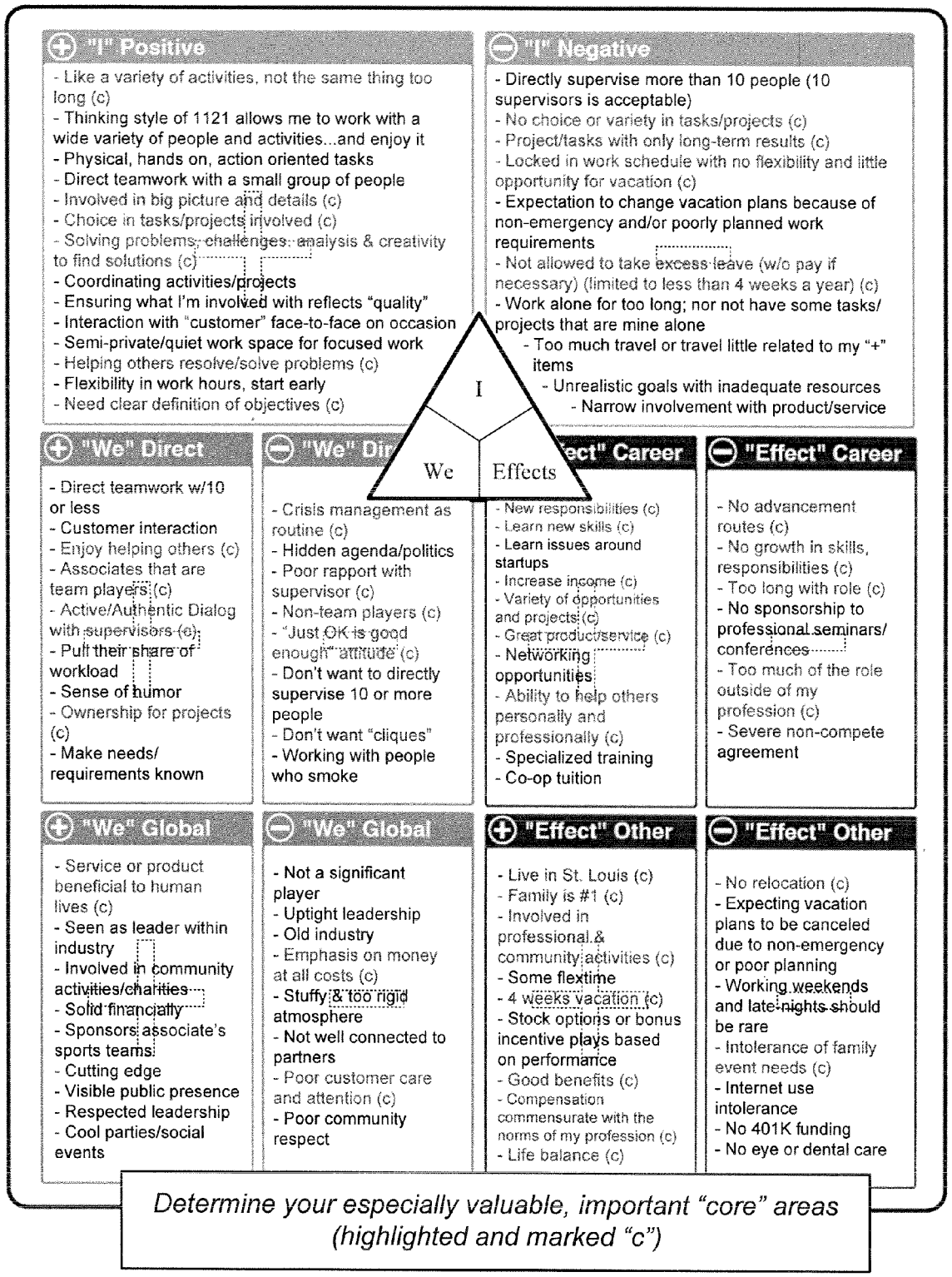
Figure 4C:
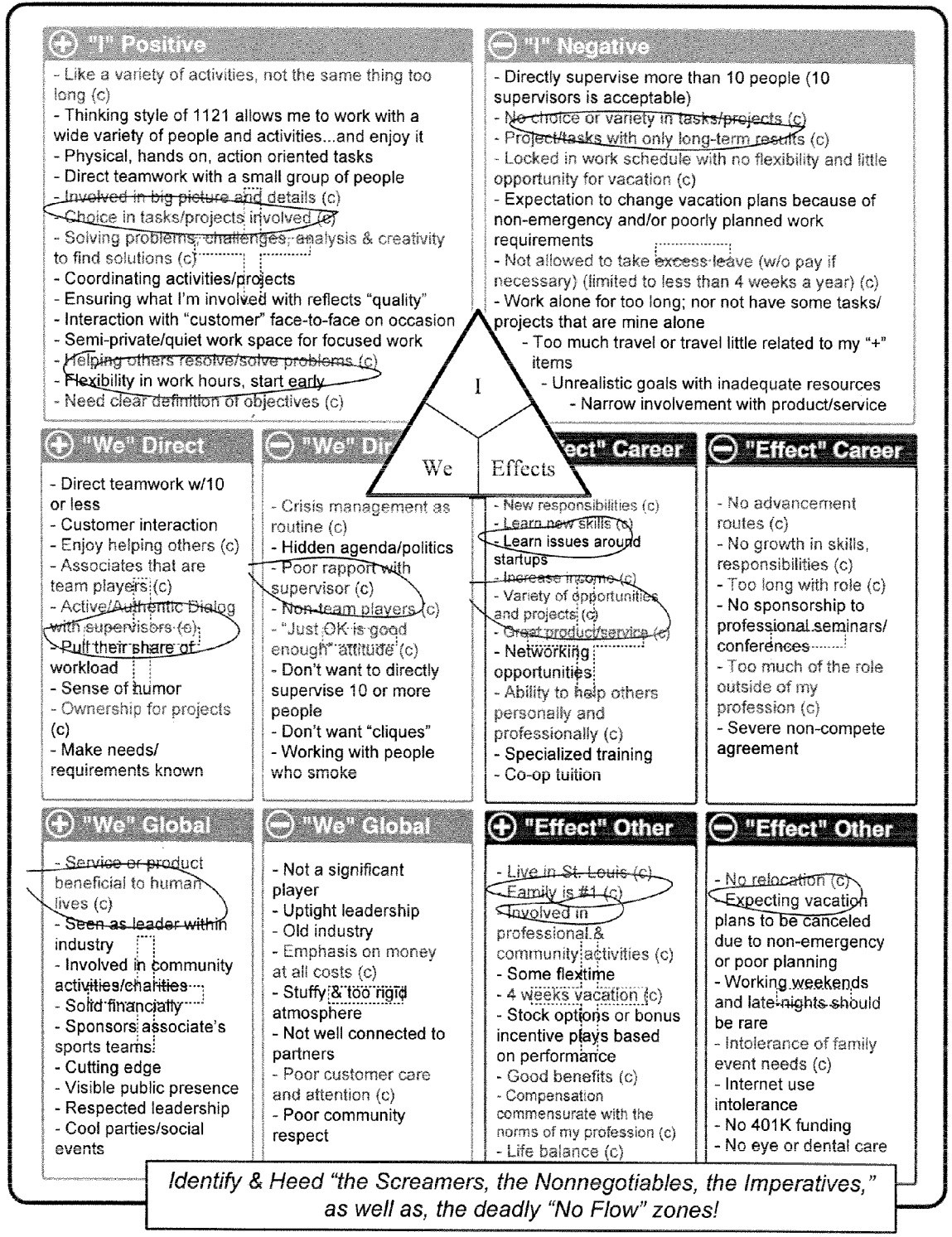

Accordingly, all of the compartments of the Personal Triangle framework can add up to 54 separate "compartments," "identifiers" or "labels" for mapping the information and data:

3 primary corners of information about the individual and work 2 biases: Positive and Negative 3 levels of importance: Inventory, Core, Screamers 3 tenses of time: Past, Present, Future FIGS. 4a, 4b, and 4c show an example of the Personal Triangle in use. The individual first lists various factors corresponding to each corner of the triangle (see FIG. 4a). This corresponds, initially, to "Inventory." In FIG. 4b, the individual highlights and marks with a "c" those items that are at least "Core." In FIG. 4c, the individual circles those highlighted items that he or she considers to be "Screamers."

Figure 5:
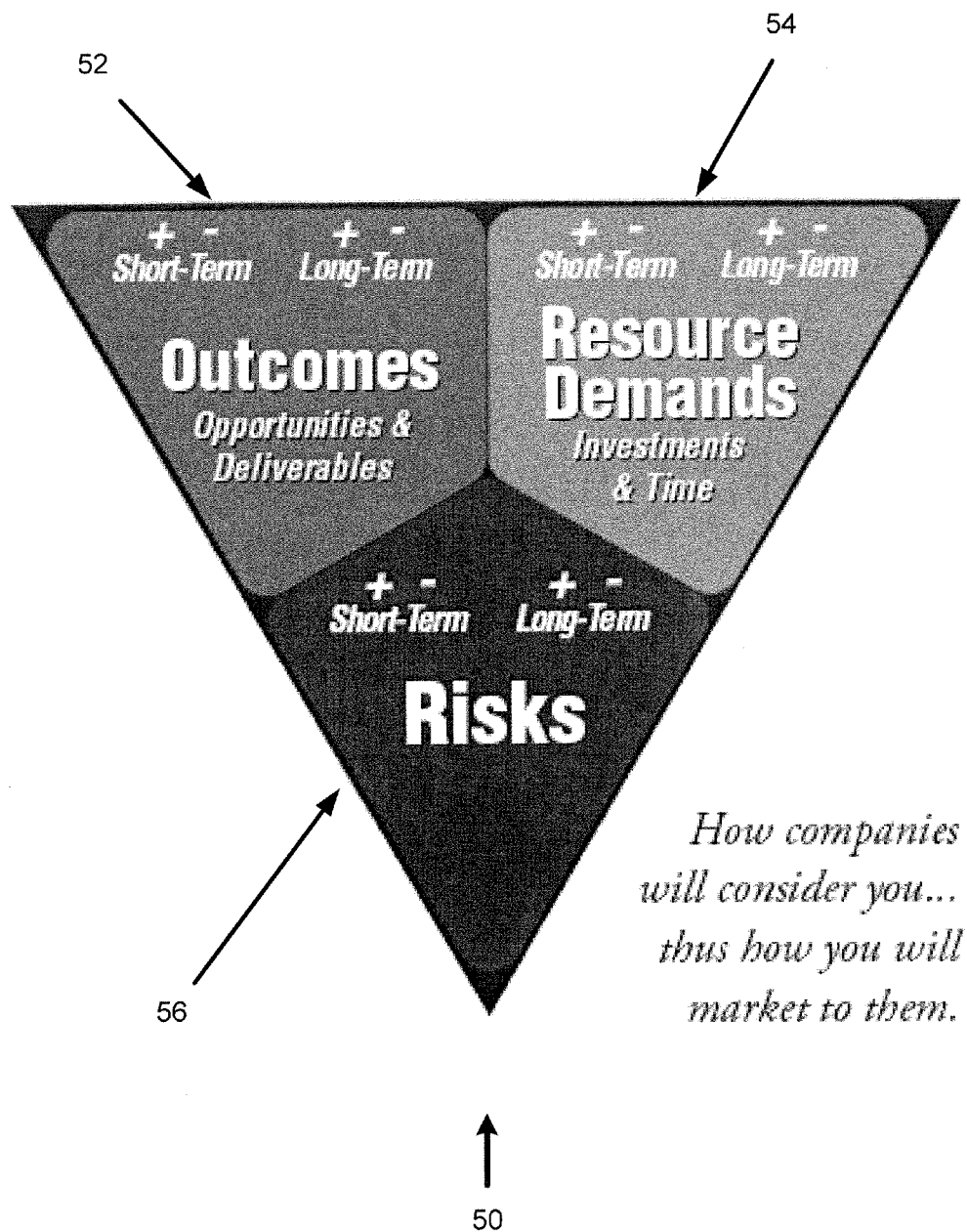
FIG. 5 is a diagram of an Organizational Triangle framework in accordance with one embodiment of the subject invention.

FIG. 5 shows a framework for an "Organizational Triangle" 50 that defines, structures, and instructs thought regarding the interrelated organizational qualities and requirements regarding a work role. In one exemplary embodiment, as shown in FIG. 5, the Organizational Triangle is an inverted triangle, with three areas in each corner: Outcomes 52, Resource Demands 54, and Risks 56. These corners reflect the primary and interrelated perspectives, decision-making, consideration factors, and motivating criteria of organizations. It provides an understanding of how an organization views everything it does and has, including work roles and the people in those work roles.

Outcomes 52 are the principle reason the role exists, and accordingly, a person's presence in the organization. If no outcomes are needed by the organization, then, by general definition, there is no need for the role. Outcomes are what a work role creates, generates or produces for the betterment and productive gain of the organization. The organization seeks to realize some opportunity, some form of deliverables, some form of output, opportunity or production that is generated in the conduct and performance of the role. The organization designs, creates and manages work roles that encompass specialized functions for its greater purpose or agenda. Generally, these roles are divided into human-sized tasks that individuals can perform, hence work roles are often interrelated with others with regard to output or outcomes. Roles and their outcomes are often part of larger, sometimes sequential, processes.

The organization seeks and invests in a person in order to gain that set of functions or tasks configured in work roles that are important to its charter and purpose. Outcomes often justify the investment an organization is willing to make in order to gain returns. An organization is moving forward on a focused agenda, and it has divided what has to be done into distinctive modules of work functions. These are filled by people who together make it possible to fulfill the complete and comprehensive organizational agenda.

One can think of roles as fruit-bearing trees in an orchard, that in combination with the nourishment of soil, sun and water and the cultivation of management, play their part in contributing to the well-being of the whole orchard. It is this corner (Outcomes) that sometimes ranks above all else in the organization's interest. However, Outcomes may or may not be the most important motivating performance factor in decision-making when an organization is considering investing in an individual. This is true whether it be in a temporary or ongoing relationship, or whether one is a candidate for a role or a long-term employee.

With regard to Resource Demands 54, organizations seek to keep resource demands as low and modest as possible. A few of the many resources an organization has include but are not limited to the following: money, training, support, management, time, facilities, equipment, benefits, and anything else that is a cost or expense to an organization or must be provided for the role or the person within it. Organizations know that nothing is free. They recognize that they cannot gain the desired outcomes and the expected performances from people if the organization is not willing to invest in some proportion.

However, they do seek to invest resources in a wise and prudent manner. They want to get as much as is reasonable with as little resource demands and allocations as possible. They know that this is possible, in part, because of a competitive talent marketplace in which they have choices and options at their disposal. Furthermore, they must consider all the demands for resources across all relevant dimensions-capital (money), time, attention of other people related to the role (such as management/leadership), benefits, tools, facilities, training, education and countless other allocations and investments which relate to the role directly and indirectly.

The more one can reduce the possible demands on an organization's resources required for that individual to deliver the greatest possible outcomes, the more that person will be regarded as a great investment. One can learn to be quite competent at constantly managing this ratio to add horsepower to his or her career, keep it out of jeopardy, and keep it from coming to a halt.

Sometimes a role may exist, whole or in part, simply to help the organization reduce resource demands. The term "ROI," which is Return on Investment, is becoming more and more prevalent in the language of managers and leaders. An organization is constantly striving to get the greatest possible return (Outcomes) with the least possible overall investment (Resources). Therefore, it is not enough to judge performance merely by outcomes, for the resources that a person requires in their role are equally important. For example, if an organization has two choices of high role performance, and one demands less total resources than the other, the option with the less resource demands will be chosen. One should always strive to be "the best ROI option" an organization has within its many choices and alternatives.

With regard to the third area, Risk 56, organizations detest and disdain risk. They seek to avoid risks any way they can. They are constantly doing all they can to manage the risks that are in their operations. This is especially true in their consideration with regard to their investments in roles and the people who occupy them. Whether considering the risks in the hiring process or of maintaining a current relationship with a person, the organization is hypersensitive to risk avoidance.

Organizations know that some risks are inherent. However, organizations spend a great deal of attention to ensure that risks are understood, minimized and mitigated. Often the organization's risks are well thought-out and diagnosed. On the other hand, risk may be based only on myth and perception, not well grounded in reality. In either case, when organizations consider their roles and which people should either fill or be kept in those roles, they will always be considering what risks may be present.

Risks associated with investing in the individual, like the other two corners of the Organizational Triangle, are often relative to other options the organization has, and other choices and other paths they can take. Sometimes, this is the choice of the individual versus another person in the role. However, in some cases, this is a comparison of the role as filled by a person versus a change in process, the addition of a new machine or technology, the merger with another company or the use of an outsourced contractor. One must be astutely sensitive to organizational viewpoints of risk, and do all possible to ensure that he or she is seen as the best path to avoid risk, as opposed to a path containing many risks.

In some situations, it is this corner, not the other two, that is paramount in the decisions that organizations make—yet few people know and act on this. Risks, as the organization interprets them, carry equal importance to all other aspects of work role performance (Outcomes and Resource Demands). Historically this can be the greatest area of hidden, treacherous rocks that sink successful work relationships.

While Outcomes are typically the reason for a role's existence, the Resource Demands and Risks corners reveal major forces that may impede or further advance a career. The individual must understand and provide personal role results continuously in all three corners.

In one exemplary embodiment, Outcomes are to be amplified, whereas Resources and Risks are to be reduced wherever and however possible. Although many organizations, managers and recruiters do not even realize it, virtually every decision they make, including decisions related to the acquisition of real estate, professional services, vendors, supplies, equipment and even their strategies and research, directly or indirectly, consciously or unconsciously, revolves around the three areas or corners of the Organizational Triangle, including other considerations or dimensions of information in each corner.

Figure 6:
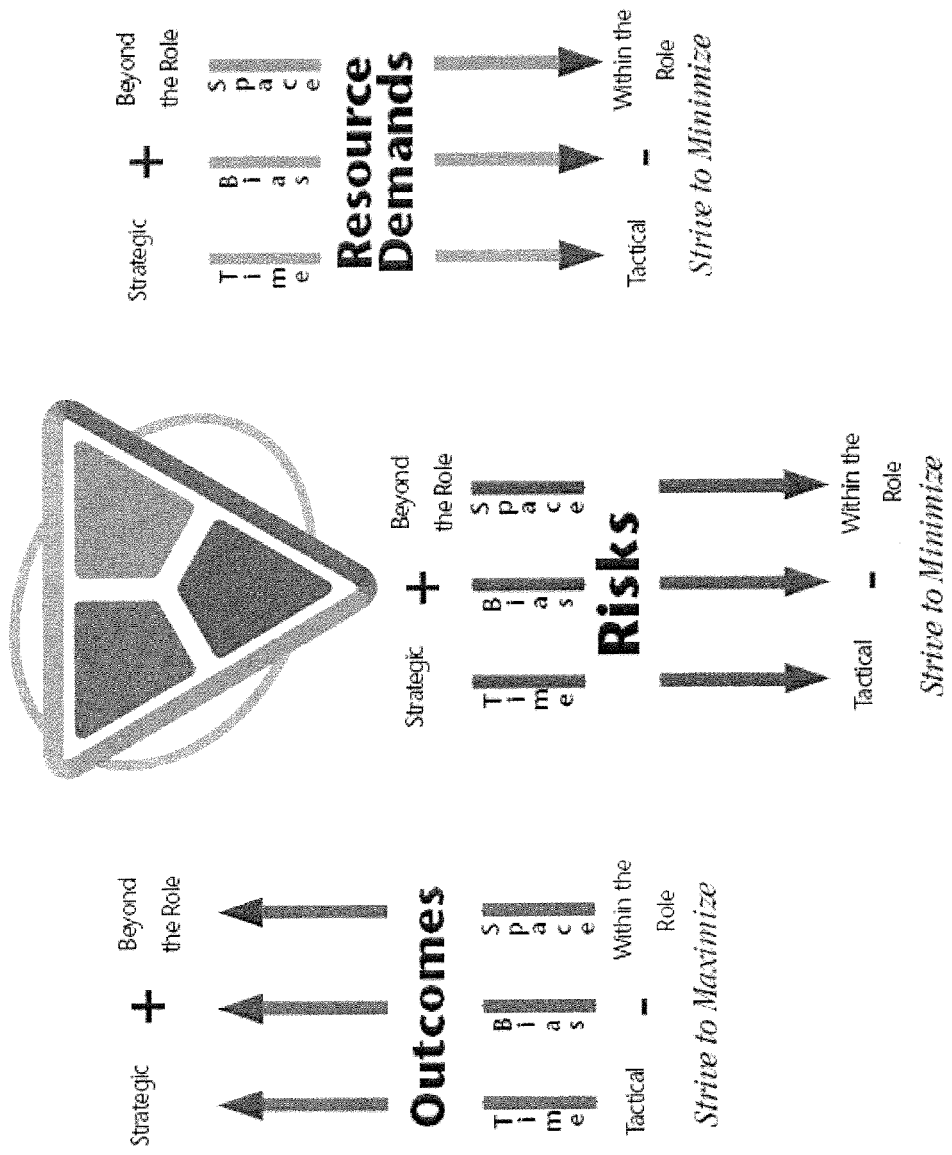
FIG. 6 is an alternative diagram of an Organizational Triangle framework with dimensions in accordance with another embodiment of the subject invention.

As shown in FIG. 6, there are three Additional Dimensions of each corner of the Organizational Triangle. As in the Personal Triangle's additional information and diagnostic dimensions beyond its primary corners (importance, time and bias), each corner of the Organizational Triangle also has additional dimensions of information. Though each primary corner of the Organizational Triangle has its own unique characteristics, the three general dimensions shared by all three corners are:

Bias: knowing or diagnosing both the positive and negative information criteria regarding what the organization desires or accepts, as well as what it does not desire or seeks to avoid, within each corner.

Time: generally, regarding a work role and the person within it, the organization considers time in the short-term (tactical) time frame and/or long-term (strategic) time frame. Some roles exist only in the short-term (such as temporary or contracting roles) and some roles and those persons within them are considered "strategic talent" for long-term gains.

Space: every role has its own specific, immediate and discrete information, but each role also exists within and amongst other roles, such as teams, groups, communities and divisions, and these exist within the total or whole space of the organization, its industry and its markets.

The "Outcomes, Opportunities and Deliverables" corner 52 of the Organizational Triangle is often the "epicenter" of the organization's interest and the central reason for having a role or choosing to create and maintain a relationship with the individual. This corner describes what the role or individual provide to the organization in output or production. "Outcomes" also conveys the purpose of the role's existence or the justification of a person's employment. The organization is investing in both the individual and a role to derive the specific functions, production, profit, expressed or anticipated opportunities or results. It is in this area one answers such questions as: What is the desired product of my work each day? What are the "returns," the "gains" and the "output" that is expected from investments made in me and/or my role? What new opportunities does the organization realize from this role? How will the organization be more competitive or profitable in the marketplace because of the part I play within this role? How will the organization be more effective and/or more efficient through the performance of this role? What are the objectives, accomplishments and achievements that are slated as reasons for these role activities? What are the components, services and products or parts this role generates? How does this role relate and interact with those surrounding it? How does this role create new customers or how does it please and serve the customers we have?

Within this corner resides the many skills, attributes and functional competences that may be articulated or those required related to the individual and the individual's productivity in the role. There may be proficiencies and experiences that the individual brings to them as well as those that may be trained and developed. They may not only be hard skills and proficiencies part of a profession and function, but also include soft skills such as problem-solving, learning traits, diplomacy, creativity, conflict resolution, analysis, synthesis, detail orientation, big picture vantage, coaching, mentoring, collaboration, leadership, management, alertness and attentiveness, caution and so forth. The value of one's social and business networks, especially if one is in business development, sales, procurement, investments or are well connected in professional circles so one can be a recruiting medium for other high-performers, would reside in this area as well.

The Outcomes area addresses both general and detailed information. The individual can apply this corner to convey what he or she is capable of accomplishing for an organization from the role itself and outward across both space and time, in alignment with their charter. Conversely, the organization may do the same for the individual with regard to applying this corner. What one contributes may be tangible and intangible. Contributions may be direct and quantifiable, or indirect and qualitative. They may be focused or widespread. They may be of both direct and indirect benefit.

Figure 7:
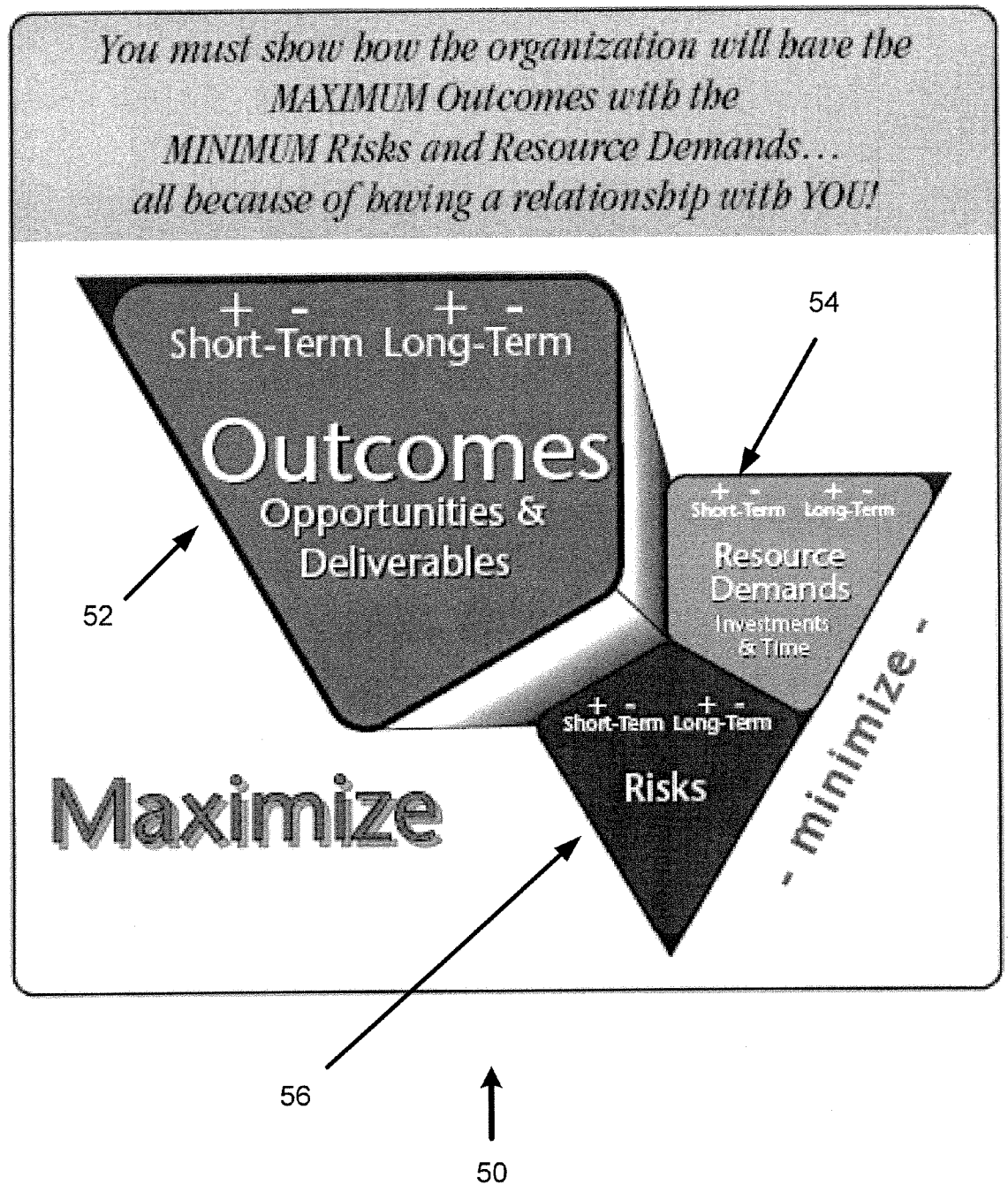
FIG. 7 is an alternative diagram of an Organizational Triangle framework with a maximized outcome area in accordance with another embodiment of the subject invention.

If one is seeking a role, the individual should make the best possible argument for what he or she can deliver to the organization for its betterment. On the other hand, if one is in or considering the role, the individual must understand all the aspects of this and the other corners for they will describe the expectations of the individual and set the directions of your desired role performance. And seen in FIG. 7, the stronger one's argument, the more the organization may be willing to invest in the individual. This will be reflected in the financial compensation package and other rewards they extend to that person, rewarding him or her in proportion to how well they reward the organization.

As organizations go on the prowl for greater and amplifying outcomes, increasingly they are putting more emphasis on "soft attributes" such as your preferred style of thinking, "emotional intelligence" and so forth—human qualities and traits that are natural as well as a product of nurturing, body of experience and maturity. This is especially true in strategic roles or for associates that are considered for their strategic potential across the space of the organization. This is partially because formal education and acquired skills have shorter and shorter half-lives and can quickly become obsolete in today's world. It is the "whole you" and "your mind's performance" that may be the most important assets rather than previous, specific experiences, education and skills.

Negative bias becomes very important in this context, for there are almost always traits that the organization just as strongly seeks to avoid as those which they are seeking to gain. Creativity is almost always in demand; therefore, one should try to give supporting anecdotal evidence and references to support this quality (or other intangibles) possessed. When one has ideas, share them, using the Organizational Triangle as a framework of how to present them. Present hard skills and knowledge are only a means to an end.

One should try to gain this type of information and perspective of the organization regarding what it seeks in applicable roles and people. Where possible, one should convey values, ethics and personal initiative. One should not underestimate the importance of these areas, especially in terms of strategic time periods, the greater space of the organization and one's potential within it. In fact, sometimes the organization's sterile and clinical hiring processes and "applicant tracking systems" blind it to what it truly needs. The individual should be alert to this and proactively rise to the occasion by ensuring that his or her message reaches the right audience and that they hear what that individual has to say. From the increased self-awareness gained from the Personal Triangle, one should confidently, assertively, and clearly articulate what he or she offers to the organization immediately and over the long term.

Resource Demands 54 is the corner that represents what the organization must "ante up" to put someone into the role and gain the desired performance. Simply put, the organization wants the maximum "gains" (outcomes) for the minimum "pains" (resource demands) and without unreasonable danger (risks). Most organizations are almost totally motivated by return on investment, while being cautious about any prevailing risks. Again these motivations are fully and completely encompassed by the Organizational Triangle's corners. Returns (outcomes), investments (resources) are always considered along with how much risk is present. Any ROI to be accepted or sustained in an organization must be significant (and it must be placed against risks, for if there is extreme risk, no ROI is great enough to motivate an organization).

Furthermore, every organization regardless of size or industry has only finite resources at any given time. This means there is internal competition and contention for who gets to use those resources and how they are utilized. This manifests itself in budgets, financial performance reports, assets and assets management and so forth. Most organizations are severely judged, based upon how well they manage and apply their resources for their agenda or wealth building. Nonprofits are held accountable by watchdog agencies and contributors. For-profits are held accountable by shareholders, bankers and sometimes even their customers. Government is, or should be, held accountable by taxpayers as well as elected officials and oversight groups.

So the individual and the role both require that an organization exchange and invest some fraction or portion of its resources to generate productivity and compensate someone for their performance. The intense scrutiny and very difficult decisions related to these investments made in exchange for role performance has historically been ignored, unseen or unappreciated by most workers. This can no longer be the case, for there can be no lasting bliss in ignorance in this area (or any areas of the Organizational Triangle) if one seeks security in one's role or mastery of their career.

In the Resource Demands corner resides all the direct and indirect investments in the individual, comprised of resources, time, compensation, work environments, equipment, training and management attention that the individual will require or demand for best role performance. Examples of these are what someone expects and demands of the organization, what the organization will have to spend, extend or compromise to have a relationship with the individual, and even how the individual expect it to behave and act toward him or her. This is not only direct dollars spent in compensation and benefits, but also the costs of waiting, if applicable, for the individual to develop skills and expertise to become productive, as well as the costs of management, mentoring, coaching, leadership and peer attention as required. It includes the cost of recruiting at the beginning of the relationship and the cost of severance, outplacement or retirement benefits at the end of the relationship. Resources include support environments and equipment such as office equipment, software, IT infrastructure, expenses, training, education and other developmental programs. Any argument one can make to show that he or she reduces Resource Demands in proportion to outcomes is always attractive to an organization.

Depending on the situation, profession and industry, investment may encompass an enormous number of other areas. Many people are surprised when they consider all the ways organizations expend resources on them. A few examples include, but are not limited to, the following:

Base wages or salary
Social Security co-payments, worker compensation payments
Insurance benefits such as healthcare, dental, eye, life, short and long-term disability
Initial Training, development and its administration
Periodic training, development and its administration
Offices and office equipment including phones, desk, computers, software, supplies
Work environments including tools, equipment, uniforms and facilities as applicable
Leadership attention, communications, monitoring, responsiveness and improvements
Management attention, communications, monitoring, responsiveness and improvements
Safety equipment and work environmental safety
Meetings and gatherings for sharing information
Peer and team distractions and attention to you or your role
Travel and related expenses
Stock options and stock programs
Commissions, incentives and bonuses
Other benefits such as childcare, tuition co-payment, employee assistance programs
401k and retirement programs
Work-related tools and services
Facilities or vehicles and all the many aspects that accompany maintaining them
Human resources administration, programs and technologies
Vacation and holiday compensation benefits
Depending on organization, profession and industry, a list (likely long) of items specific to your own or your role's requirements
People-sensitive considerations, values, actions, events and behaviors
Information technologies, knowledge and related systems and processes
Communications programs and events The third corner (Minimizing and Mitigating the Risks 56) concerns the perceived uncertainties and dangers in the role or with the individual, as well as the risks without the individual. Every investment and opportunity has risks, but organizations ferociously try to dodge, eliminate, nullify and if at all possible avoid risks. They seek to avoid any and all risks in people and in roles. In fact, they often will compromise in expected outcomes or be willing to extend far more resources than preferred in order to successfully mitigate risks.

Risks by their nature can be endless in possibilities and descriptions, and normally will be closely related to industry, profession and workplace situations. However, a number of risks generally fall into various general and universal categories such as legal risks, operating/functional risks, safety or danger risks, social risks, service or product risks, loss, damage or catastrophic risks, capital or shareholder risks, public opinion risks, competitive risks and political or public opinion risks. Most organizations are evaluating and policing risks through a variety of means across all of these areas. Anything one can do or offer as an employee and as a citizen of the organization (or as a candidate seeking a role) to nullify and minimize risks in each of these area will be well received.

Risk can be tactical or strategic. Some risks relate to long-term scenarios such as failing to innovate today in order to be competitive tomorrow, disregarding toxic discharges today that will present an environmental nightmare tomorrow, faulty engineering design, construction negligence or inattentive management today that will lead to massive lawsuits tomorrow. The quality of one's thinking and the quality of one's work often has a direct correlation to reducing risks on many fronts. This is why personal qualities of attention to detail, good judgment, human relations and communications skills, strong problem-solving skills, imagination, creativity and innovation arising from seeing what others cannot see can be so appreciated by companies and institutions.

Values and ethics can also play a very strong role in preventing risks. There are times when one should "pick up the whistle and blow it loudly," in order to save the organization, one's role, and oneself from impending catastrophe. Great thinking and effective actions are highly valued commodities in every workplace because of their risk-reducing capabilities.

Risks have positive and negative biases in work role. In most roles there are risks that organizations judge to be acceptable in order to gain the results they seek, as well as minimize resources. There are risks that organizations desire for individuals to take, such as trying new procedures and processes, innovating new products and programs, being decisive within one's realm of responsibility and authority. In other words, every role has what are considered "good and positive risks" that are encouraged or even imperative to be present for the organization's success and survival. This is why is it so essential that individual be informed with regard to what risks are part of the role and what risks are to be avoided. In fact, the ability to know how to manage and astutely navigate the channel between good and bad risks is often admired as one of the greatest qualities in workers, especially leaders, engineers, medical professionals, managers, law enforcement and so many other professions. In this context, a person unwilling to take "positive risks," thus paralyzed in their role's preferred performance, is often considered to be a "negative, unacceptable risk" because of that fact.

Often simple uncertainties or unknowns about the individual or the role are perceived as risks. Few people appreciate how serious the implications of the Risks corner is to their getting the role they seek, as well as keeping the role(s) they enjoy. One should keep in mind that he or she is always competing against the organization's other options and choices, including other people, and risk evaluation is always a factor. Also, they should keep in mind that the three corners of the Organizational Triangle are highly interrelated, but not totally, for there are many reasons, important ones, for distinctly differentiating these three areas and each of their three dimensions.

To think how one can represent one's "risk reducers" in the organization's eyes, the individual should first think of the many ways you may add risk, putting himself or herself "in their shoes." Then they should try to think of negotiable ways to minimize these risks. Where and when possible, make pay and your options partially or even fully contingent upon, or proportionate to, performance. This often ultimately allows the individual to gain much more, and yet present much less financial risk to the organization. Ideally, one should strive to show that there are greater risks if he or she is NOT within the particular desired role. Relentless risk evaluation is always taking place, and is a critical factor in organization's decisions, whether it is articulated by them or not.

Figure 8:
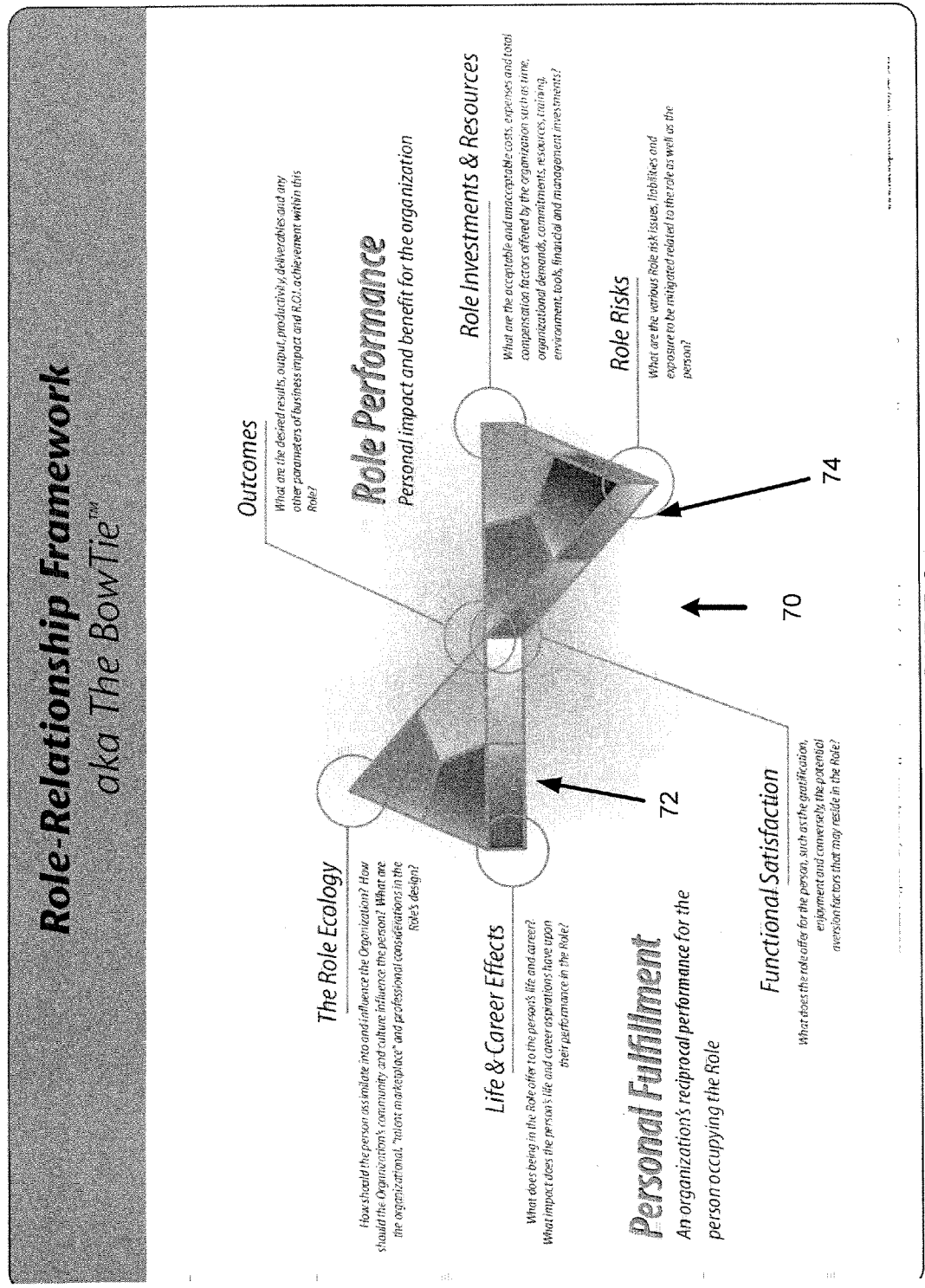
FIG. 8 is a diagram of a BowTie framework in accordance with one embodiment of the subject invention.

Relationship performance is based in part upon taking the Personal Triangle and Organizational Triangle frameworks, and joining them together into a singular meta-organizing principle for thinking, discussing, and doing the right thing in workplace relationships. As seen in FIG. 8, this framework form a "BowTie"-like object 70, joined at corresponding apexes. The Personal Triangle is seen on the left (Personal Fulfillment) 72, and the Organizational Triangle is seen on the right (Role Performance) 74, with the words "role ecology" exchanged for "We," "investments" exchanged for "resources", and "personal contributions and rewards" for "I." Everything within the two triangle constructs, however, remains and is unified to bring it all together in one holistic model of understanding, mapping, designing, and discussing work role relationships.

The BowTie accurately reflects the two different sets of performance that must be present in any healthy and lasting work role relationship: performance for the Organizational Triangle and performance for the Performance Triangle. The BowTie implies continual efforts by both parties directed at equilibrium and often the need for thoughtful and considerate compromise.

Neither party can gain what they need at the expense of the other, but rather both parties should only attempt to gain what they need at the benefit of the other as well as themselves. What either party gains must be kept in reasonable equilibrium of value with what is given to the other. It is the model of today's most common and prevalent form of bartering—giving a substantial portion of peoples' lives, attributes and abilities to an organizational community's purpose, in order to gain what individuals desire from that exchange. Only the two parties involved can effectively determine and negotiate what this equilibrium means and should be for their respective and reasonable best interest.

Neither party can "ignore," "deny" or "jettison" the other's framework and relation to how they must perform for them. Once the BowTie becomes a part of the relationship, a shared body of knowledge and a shared common language, there is no place to hide. There is neither blissful ignorance nor the confusion and mystery of darkness. The BowTie is enlightening for everyone in the seeking of solutions and the resolution of conflicts and problems. In the absence of the unifying BowTie, people quickly embrace and love their Personal Triangle, and, equally, organizations embrace, love and point to their Organizational Triangle. However, it is in the "other" triangle of the other party that each find challenging and appears to be "strange," "alien" and "uninteresting." They do not want to address it or think about it. They want to get more than they want to give. This explains a lot of the problems people and their organizations have each day. The "other triangle" provides each party with their leverage and their power in forming and sustaining their relations. With the BowTie, The "other triangle" goes from being an alien in the beginning to being their best friend and tool in application.

Figure 9:
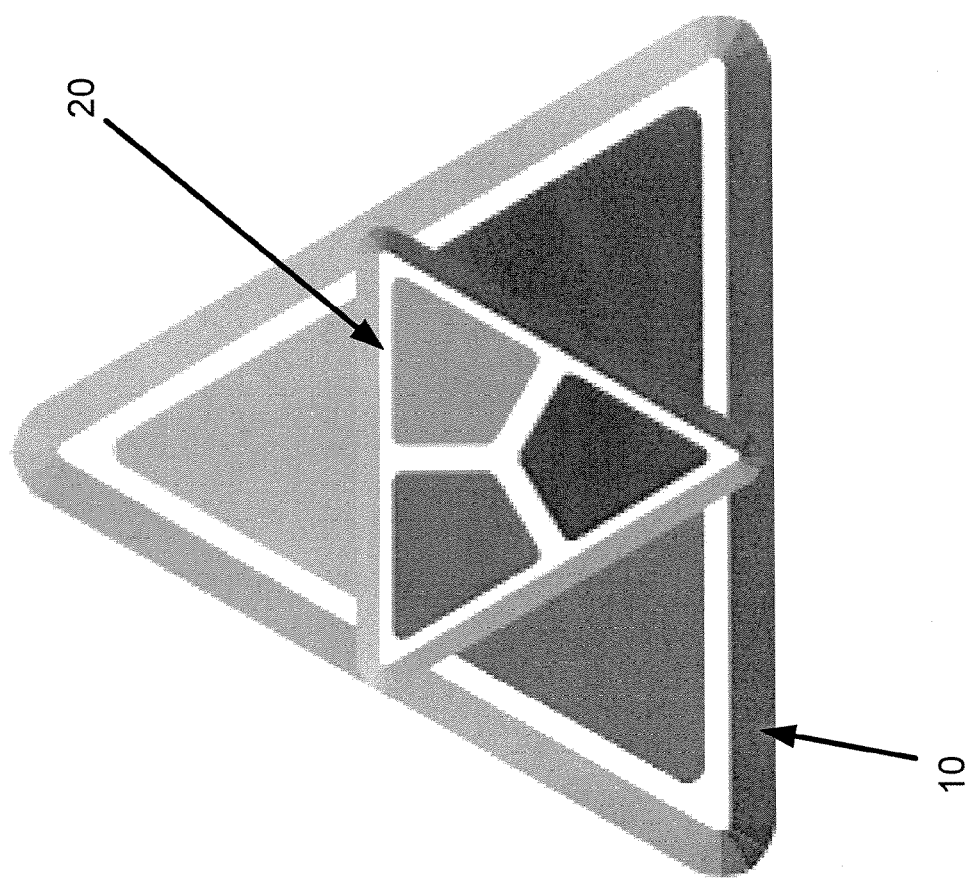
FIG. 9 is a diagram of a flat Nested Triangles framework in accordance with one embodiment of the subject invention.

While the BowTie construct is useful, it is oversimplified. A fundamental true of Relationship Performance is that work roles exist within people's lives, not vice versa. Accordingly, a more accurate, and more complex construct, is that of the flat Nested Triangles, as seen in FIG. 9. The exact placement of the inner Organizational Triangle 20 is not critical. In fact, it may be more accurate to think of the Organizational Triangle 20 as rotating and moving, including changing size, within the Personal Triangle 10. The goal is for the Organization's work role triangle to exist reliably and optimally within the right Personal Triangles.

Figure 10:
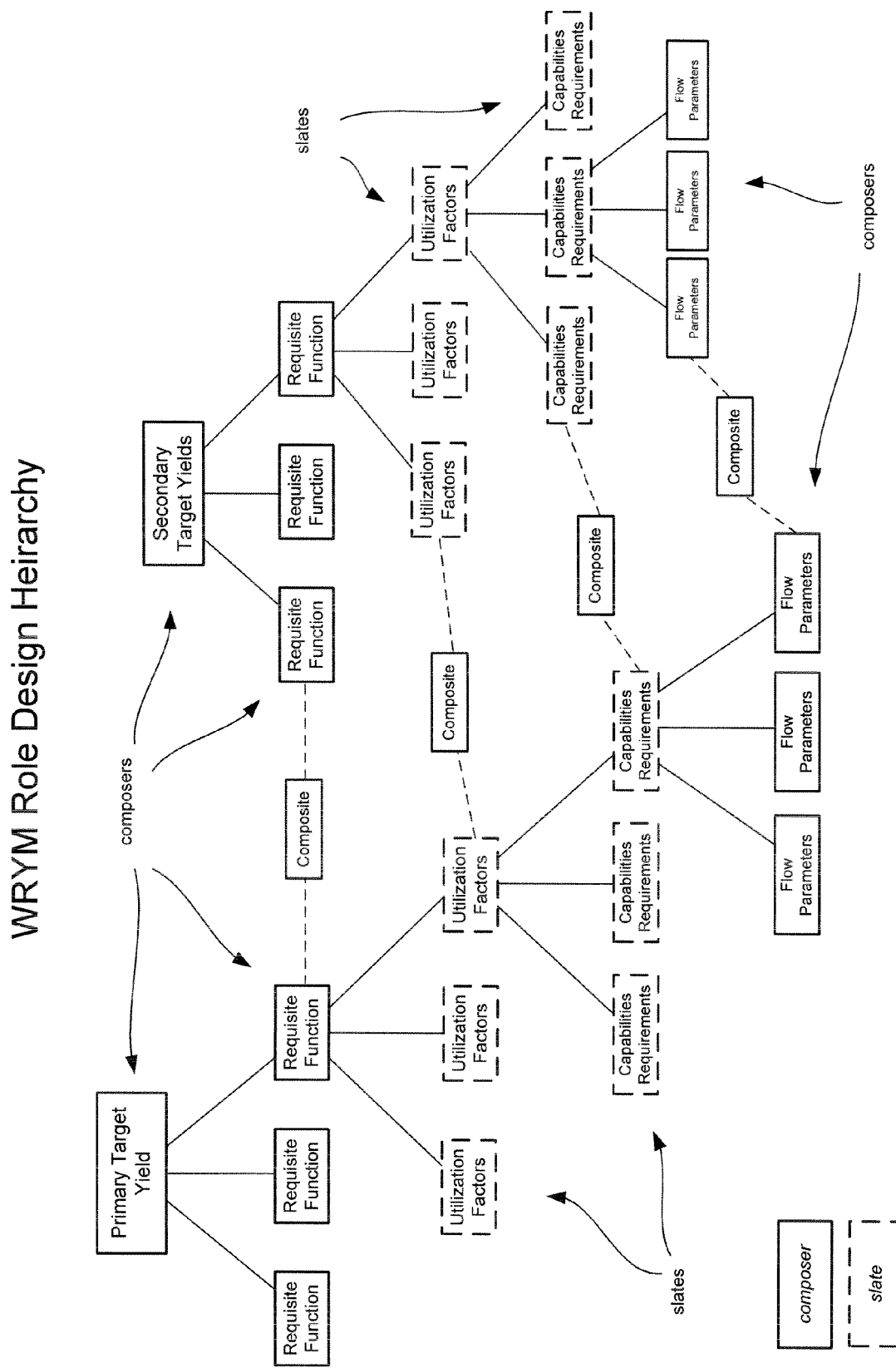
FIG. 10 is a diagram of a Work Role Yields Management (WRYM) Work Role Hierarchy framework in accordance with one embodiment of the subject invention.
Figure 11:
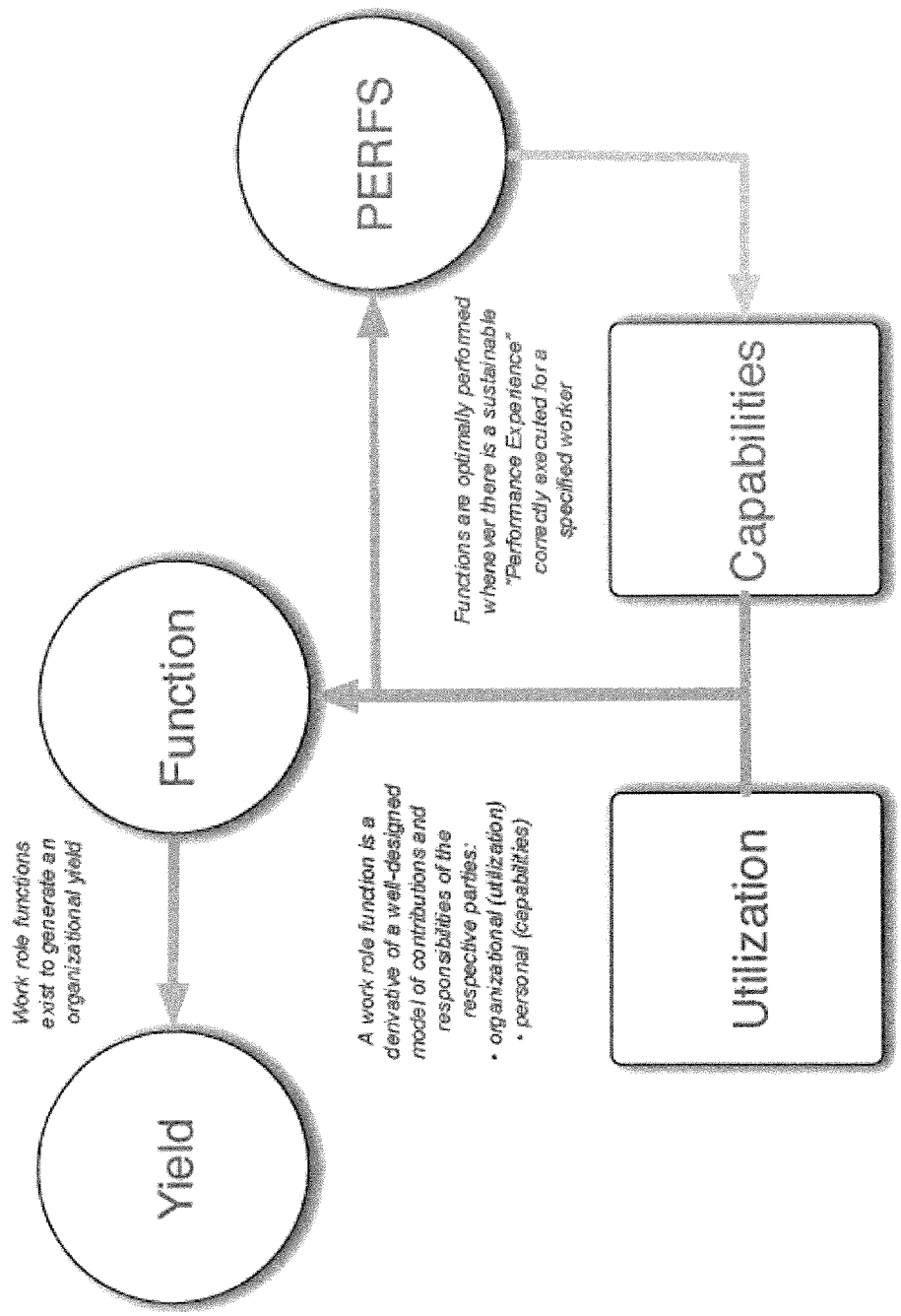
FIG. 11 shows the relational view of the Nested 3-D Work Role framework in accordance with one embodiment of the subject invention.
Figure 12:
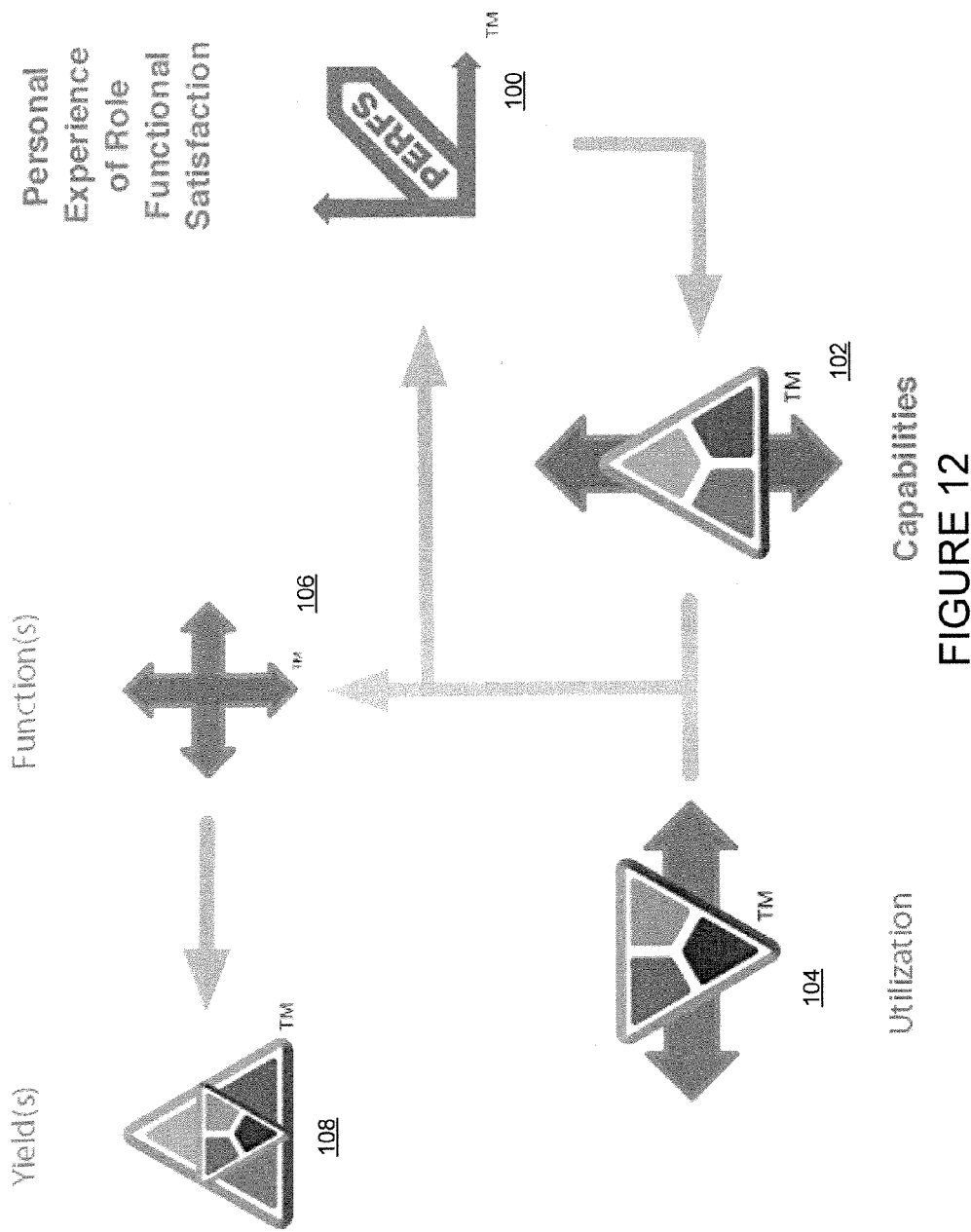
FIG. 12 is a diagram of the Nested 3-D Work Role framework in accordance with one embodiment of the subject invention.

The flat Nested Triangle model can be expanded into a three-dimensional model. The Work Role Yields Management (WRYM) Work Role Hierarchy, as seen in FIG. 10, is one additional dimension. Merging the Work Role Hierarchy with the flat Nested Triangle Model results in the 3-D Nested Framework, as seen in FIGS. 11 and 12.

Figure 13:
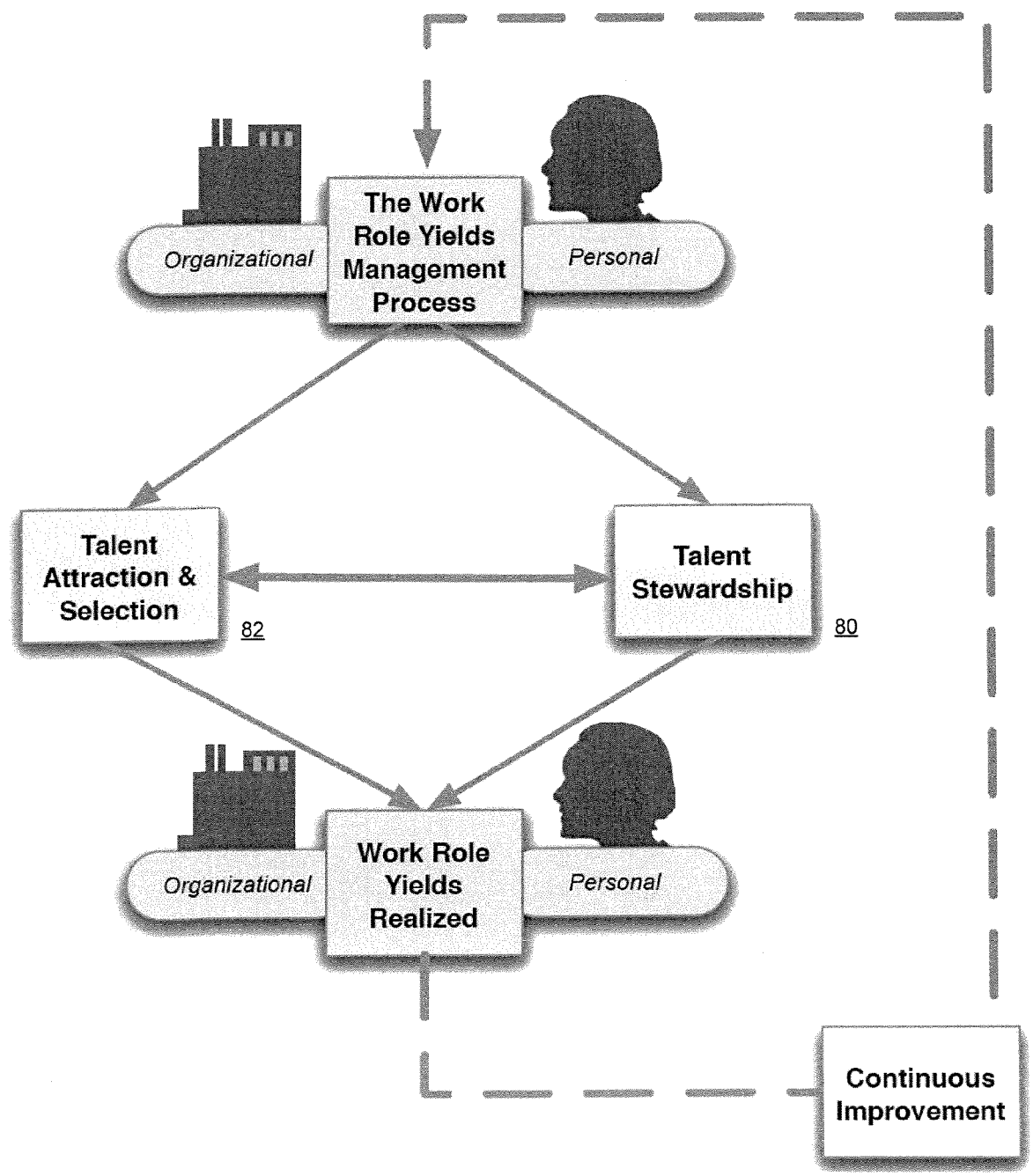
FIG. 13 shows a general view of an embodiment of WRYM in accordance with one embodiment of the subject invention.

FIG. 13 shows a general view of an embodiment of WRYM. At the center of WRYM is the best possible design and execution, or some may say "engineering," of each work role. WRYM is accomplished through a process of continuous improvement. The well-designed work role includes the blueprint for talent stewardship 80 as well as talent attraction and selection 82. It guides management, recruiters and leadership down a reliable path to greater human performance in each role while providing greater work role satisfaction for each worker. Returns on investment soar while risks and resource demands are reduced. As in any worthwhile organizational endeavor, competence, discipline, tools and sustained commitment are required.

Yields, as generally considered in WRYM, are defined as the overarching objectives that both parties desire to achieve from each respective or applicable work role, or assignments therein. However, yields will more specifically relate to the organizational side of the work relations equation. Furthermore, in WRYM, whenever the term "performance" is applied, it is done at a subordinate level and used only with respect to work role functions that contribute to greater or higher level yields. WRYM considers performance an attribute of contributing role functions that leads to targeted yields. This is analogous to the various functional "performance characteristics" of an automobile's drive train components, or the processor chip or memory of a personal computer, carefully engineered with reasonable, realistic compromise and balance to suit the greater desired duties, specifications, product's objective (i.e., yields).

Said another way, performance means nothing if it does not lead to the desired yields. Therefore in WRYM, functional performance is relative to the yields that are sought, just as in most other engineering realities. What is good functionally for one circumstance may be very bad in another, so the ultimate yields one desires must be defined. Functional performance is a means to an end. The end is yields.

In WRYM, yields, the contributing functions and their performance parameters thereof, are methodically considered and determined in four vital contexts of a work role and the person within the role:

1. Personal capabilities: latent qualities and competence residing in, or developed within, a person enabling their responsibilities.
2. Role utilization: the role's kinetic facilitating activities, infrastructure and supportive ecosystem.
3. Personal "Flow": the zone where the greatest utilization and personal satisfaction is obtained.
4. Composite role design: with compromises and optimization of the above three sets of parameters, in functions and support systems thereof, in order to predictably generate and sustain the best possible yields from each person within each role throughout the duration of work role relationship, from early attraction and first impressions to work role transition. The important distinction between "yields" and "functional performance factors" serves to better address both organizational and personal realities.

WRYM is comprised of the integration of knowledge, tools and systems components for each constituent's application. "Constituents" refers to all the varied types of person impacted by a work role: management, workers, candidates, recruiters, and so forth. Examples of the types of components and applications used within the practice of WRYM are as follows:

1. The requisite WRYM body of knowledge inclusive of organizing principles, methods and practices (which may be available via online education resources as well as on-site training or integrated into other curriculum and learning environments). Work role dynamics are extremely complex and multi-dimensional, and, as such, it is vital that each person and organization applies appropriate framing and modeling of all pertinent aspects of the role. Heuristics ensure accuracy in structure, taxonomy, language, communications, feedback, role diagnostics, predictable design of a role and its ecosystem and throughout Work Role Yields Management practices and infrastructure. This body of knowledge addresses all aspects of work role yields across the role's lifecycle (from attraction and selection to transition beyond the role).

2. Computer-based tools for application and general deployment of work role diagnostics, design, management and role knowledge repository (essential for continuous improvement). rpSlates&Composers (rpS&C) is an example of such tools.

3. Online ASP (Application System/Services Provider) systems for more effective connection and interplay between workers and their stewards, candidates and recruiters as well as between stewards and leadership or administrators. This includes features for detecting, surveying and polling personal and organizational factors that amplify or inhibit role performance.

4. Contextual talent stewardship tools, systems and resources to facilitate the most effective stewardship, leadership and recruitment for perennially harvesting the work role yields sought by the organization. An application for this function is described herein as PerformanceHarvester.

5. Contextual personal career management tools, systems and resources to offer individuals greater perspective and continuous support, as well as organization information capture and early warnings of personal role yield needs, requirements and issues. An application for this function is described herein as PerfectAgent.

6. Contextual recruitment tools, systems and resources to enable and empower the most effective and efficient attraction and selection of talent. An application for this function is described herein as TalentHarvester.

7. Contextual tools, systems and resources to precipitate, unleash, and facilitate optimal creativity, invention, problem solving, innovation and management within a workforce community. An application for this function is described herein as InnovationHarvester.

Figure 14:
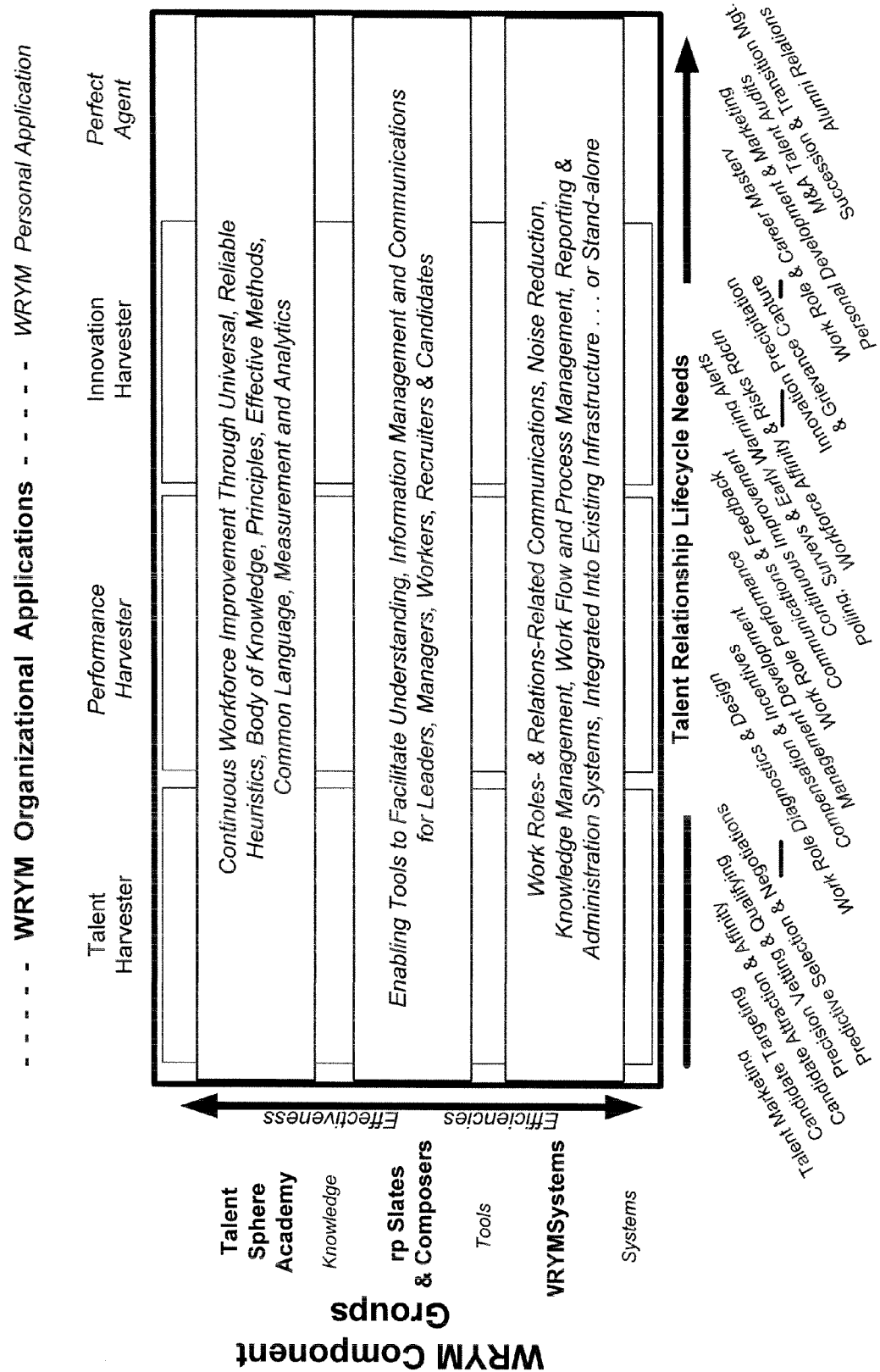
FIG. 14 is a diagram of WRYM Organizational and Personal Applications in accordance with one embodiment of the subject invention.

As shown in FIG. 14, the above components and applications can be seamlessly combined or separately integrated to enable organizations and workers to define and pursue elegant processes of continuous improvement in work role relationships and the achievement of each party's objectives.

Figure 15:
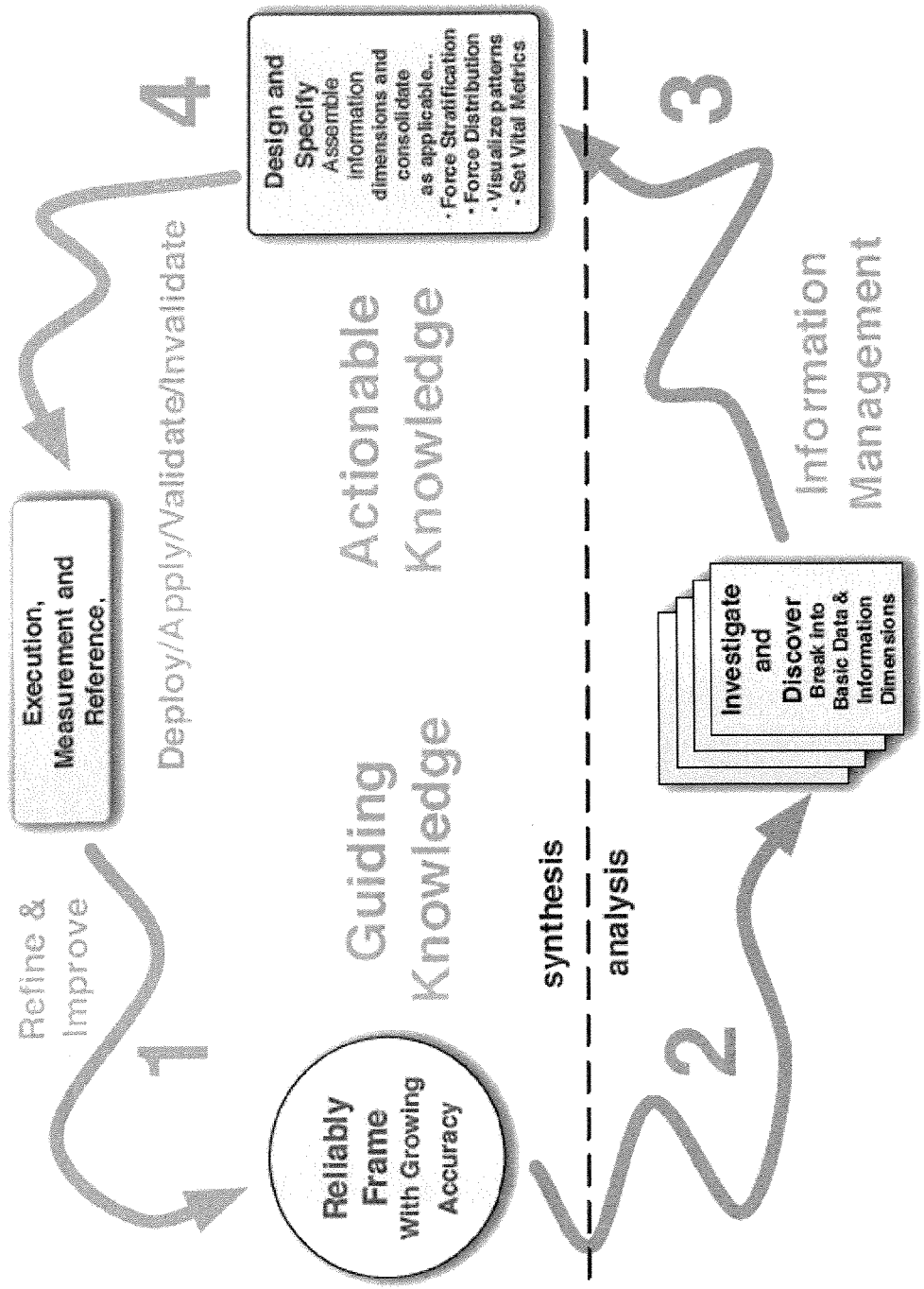
FIG. 15 is a diagram of the Cycle of Knowledge in accordance with one embodiment of the subject invention.

WRYM integrates with the Cycle of Knowledge (CK). The Cycle of Knowledge is shown in FIG. 15. The Cycle of Knowledge is a universal approach to knowledge and wisdom. It is organized as four critical steps in a continuous process:

| | |
|---|---|
| 1. Reliable organizing framework | Guiding Principles/Knowledge |
| 2. Investigation, inquiry, analysis/research | Information Management |
| 3. Design synthesis/form hypothesis | Actionable Knowledge |
| 4. Execution, measurement, testing | Validation and Refinement |

After completing the fourth step, the user returns to step one and begins the next cycle, and, upon doing so, all that has been validated and added to one's knowledge of the role in the prior cycle, will now be considered and added as "guiding knowledge." In this and subsequent cycles, work is in a mode of refinement and remedy, not new construction and longer. In the second cycle and beyond, during step 2 one investigates only those areas that the individual seeks to improve or correct. In step 3, they only modify, adjust and add new experiments. From this stronger foundation, one will then begin another cycle for exploration.

The cyclical aspect of this process is just as important as any of the four parts. In many respects, CK has no beginning and no end. Knowledge is never perfect or absolute and seldom is static.

Figure 16:
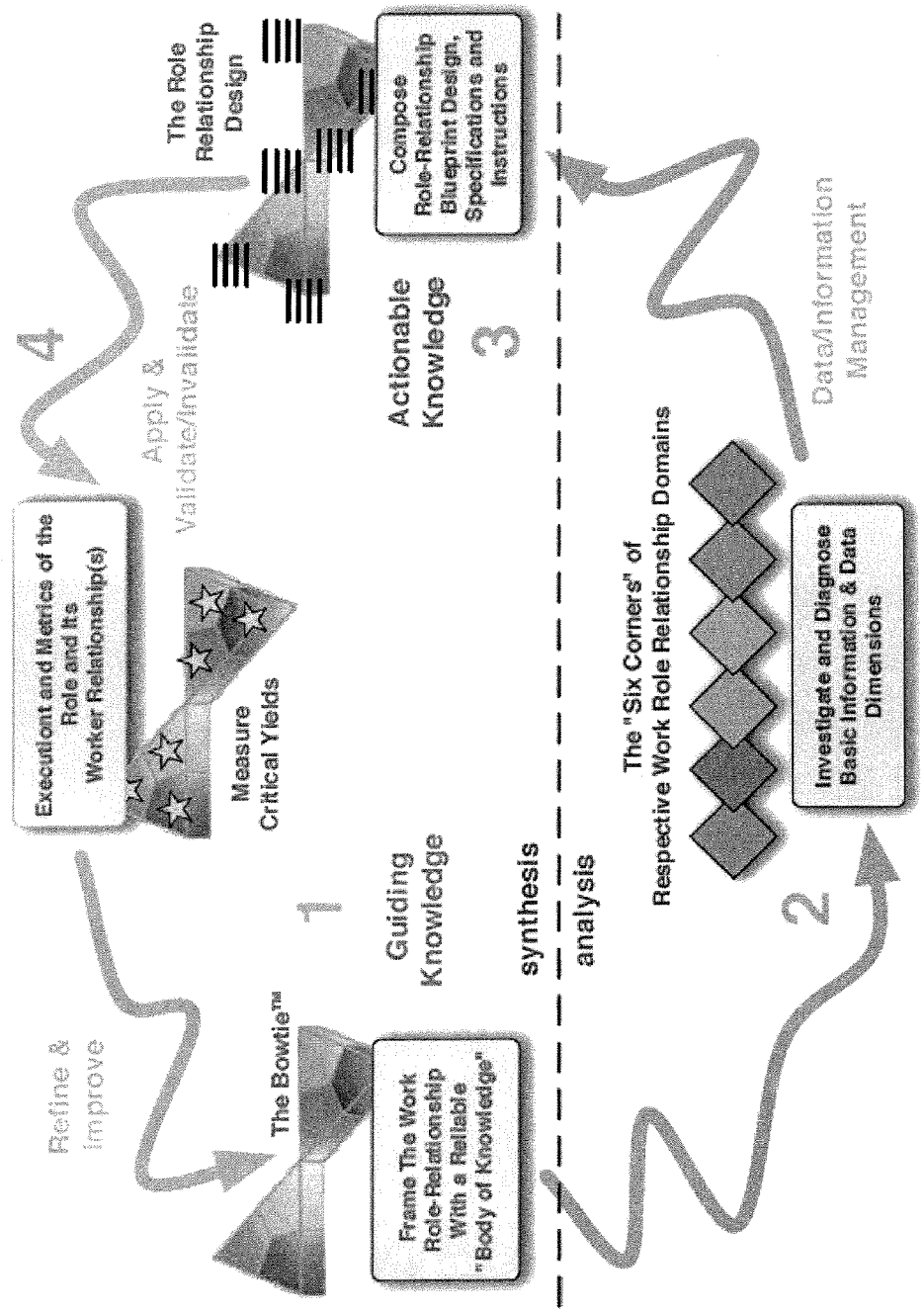
FIG. 16 is a diagram of the Cycle of Knowledge integrated with WRYM in accordance with one embodiment of the subject invention.
Figure 17:
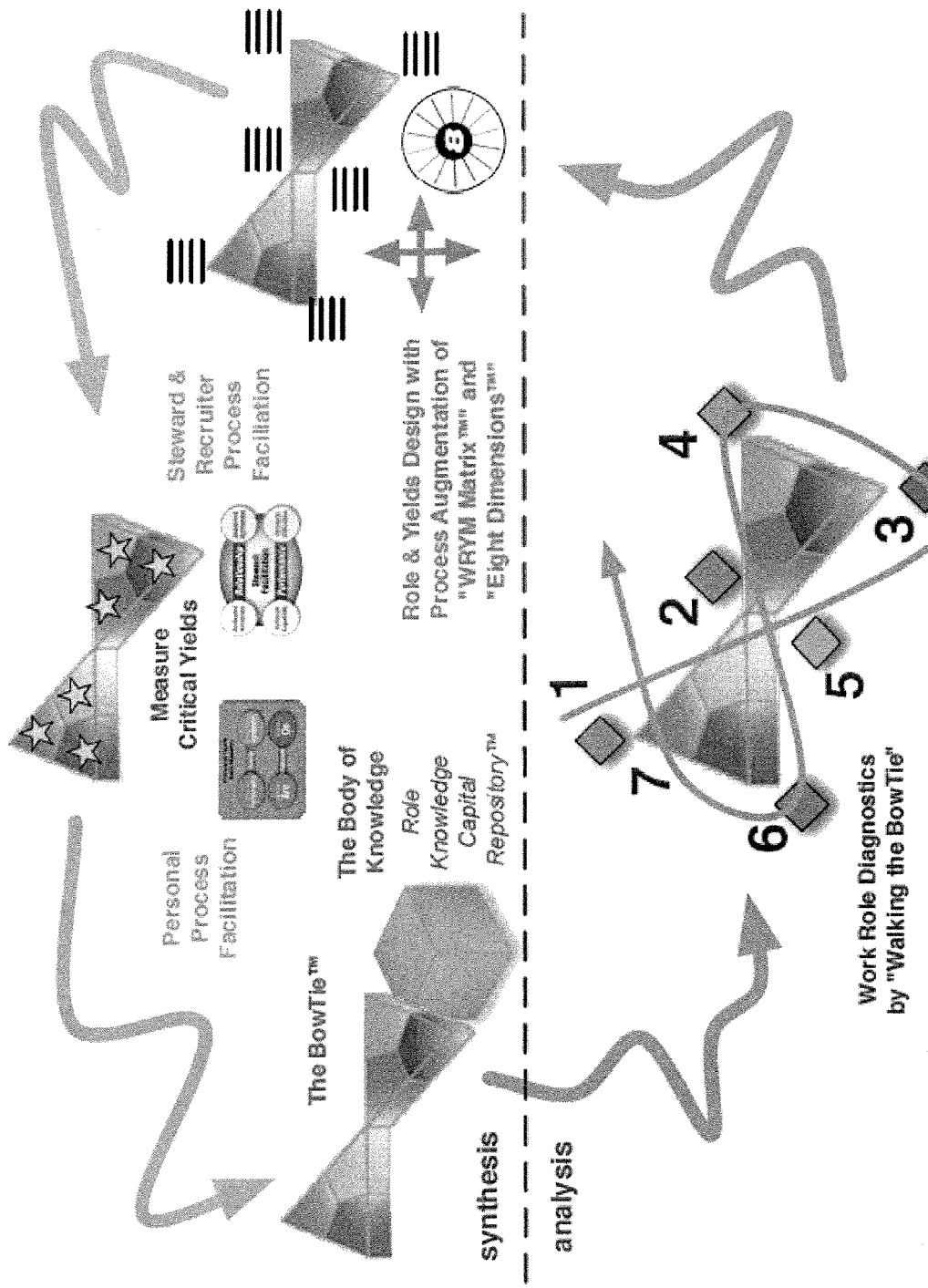
FIG. 17 is a diagram of WRYM meta-and macro-process examples.

FIG. 16 shows a view of an embodiment of the present invention, where CK principles have been integrated with WRYM. FIG. 17 shows an example of how the BowTie approach fits into the WRYM CK process. A Cycle of Knowledge meta-process (that is, a larger, all-encompassing process) has macro and micro-processes within it. This is analogous to how the BowTie is a meta-principle comprised of two macro principles (Organizational Triangle and Personal Triangle), which in turn have their own various sub-components (e.g., the respective corners, the many sub-layers).

In the Guiding Principles area of the CK is the Work Role Knowledge Repository (WRKR). The WRKR is simply a way to input, store, manage and modify the accumulated knowledge concerning an organization's work roles and role relations as it moves through the cycles. Typically, this is a multi-faceted information "meta-database" used to secure and present role information gathered during the cycle, as well as archive historic information, diagnostics, designs and metrics. WRKR becomes, in essence, the library, archive and catalog for all aspects of the work role. The WRKR becomes the "work role library" for accumulated knowledge regarding a work role and relations to provide greater guidance and understanding so an individual can sustain progress and achieve greater yields.

In the Information Management area is the step-by-step investigative process of "Walking the BowTie." This is one example of many straightforward and sequential processes which guides and allows straightforward and sequential processing to dig deep and wide in the key domain of role relations for greater understandings prior to role design or as problem solving within an existing role. This information is stored and managed within the WRKR database.

In the Actionable Knowledge area are two icons that represent the Framework of Functional Performance and The Eight Dimensions. Each of these is applied to develop one's role-relationship design as well as yields objectives when constructing a work role design. These drive creativity, compromise and practicality in the effort to optimize role design, accurately determine role yields sought to be gained or avoided, and the plan to manage and measure those yields. These tools lead to the best possible role design, which will be placed in the WRKR.

In the Validate and Refine area are examples of "constituent process frameworks" that can be offered to all constituents in the workplace so they each can perform at their best. The Work Role Mastery framework and the Talent Stewardship framework, the examples shown, are processes for employees and managers, respectively, to gain perspective and guidance in their daily yields management of workforce relations. In doing this, not only does the entire workforce function upon common principles and speak a common language, but also as this occurs, validation, metrics and refinement mechanisms (polling, surveys, yields/performance measurements, etc.) become congruous and relevant with one's greater continuous improvement process. This information will also be placed in this WRKR.

The 3-D Nested Framework uses "Personal Experiences of Role Functional Satisfaction" or PERFS. These provide the organizational perspective and predictive analytics of "flow." Flow is the generalized construct of a worker's satisfaction and fulfillment derived from the alignment of the Screamer and Core elements of a worker's Personal Triangle within one work role and work environment. Flow is generally a rather positive condition for all parties. Flow, although abstract, is described most clearly from the personal perspective.

WRYM, however, needs more than flow for such an important worker condition or work role experience. Certainly, flow is a very positive condition in any person's life. However, in an organization's realities, a person in a state of flow can actually become problematic and negative for the organization under certain conditions. Flow can sometimes even become a problem for the worker, especially in a period of growth, change or "stretch," such as for the newly hired candidate during the process of assimilation in a new organization or role.

The distinction of PERFS from this general concept of flow is important to WRYM and the Nested 3-D work role architecture. PERFS is the organizational construct to more precisely design, apply and leverage the personal state of flow. In WRYM, there is a need for a distinction and perspective related to flow that resides entirely within the domain of an organization's work role design. PERFS is the organizational framing of a personal state of flow while in a given, defined work role. PERFS is the organizational framing as to the power of a personal state of Flow.

Flow is used with relation to the personal, and, thus, relates to the state or condition of the worker, not diagnostic or a design criteria for the role per se. Flow is what a worker seeks, has, gains or does not have or gain. The organization cannot control, command or dictate a specific person's state of flow. This is true despite its best intentions and attempts to help, assist or motivate the person in a given role. Flow is a personal matter that only emerges from the needs, motivations and compromises a person determines within their Personal Triangle with regard to work and the other aspects of their life surrounding and touching their work.

PERFS embodies an organization's interest and agenda related to specifying and achieving ideal worker conditions for peak work role performance. PERFS addresses what an organization can do in order to diagnose, specify, design, manage, maintain, measure and refine to this end. PERFS is the aspect of work role architecture that guides the placement of specific human needs characteristics, attributes and qualities into a work role that will be most likely to generate and sustain personal Flow while delivering top performance within that role.

Through attention to PERFS, not flow, the organization can achieve top role performance by the investigation and subsequent design of the work role experience so that qualified workers can be defined, attracted, selected and stewarded in the role so that they predictably maintain a personal state of flow within the functions of the role. A worker's flow cannot be reliably achieved through management's hope, goodwill programs, increased compensation plans, creative benefit plans, culture shifts, fortunate accidents or luck. All workers can and should achieve flow within their work. However, only a few workers-at-large will realistically achieve and remain in flow within a given work role. PERFS is what is applied to generate "fit" and performance by specifying worker characteristics to ensure flow in those you select.

From a WRYM perspective, whereas PERFS should always be pursued, flow itself is not always positive. Sometimes a person will be in flow performing functions that are not aligned with the organization's objectives. Flow is a powerful force that provides great results or problems, depending on the mastery of work role design and subsequent selections and stewardship.

One of the first implications of PERFS is the acknowledgement that a worker can be in flow and yet be a very poor performer if they are not performing the functions the organization seeks. In fact, an entire workforce can be rather upbeat and positive about their work and be taking the organization down a road of jeopardy or even oblivion. Flow in its own right is not necessarily ideal, and, actually, Flow can seriously jeopardize work role performance, thus, yields.

PERFS describes the organization's exclusive viewpoint and vantage of addressing and exploiting (and cautiously respecting) the power of Flow in workers. It is in the interests of everyone to make work role experiences most conducive to worker performance. To do this, one must consider the work role's functional experiences as well as the characteristics of workers that will truly appreciate and flourish within that experience (having sustainable flow). Utilization design establishes organizational responsibilities and drives a worker's functional "ambient" experiences, whereas capabilities design precisely considers the personal responsibilities and specifies the type of worker or candidate attributes that seek those responsibilities in their Personal Triangle.

As mentioned above, a worker can be perfectly in flow in a workplace, yet extremely deficient in their desired performance. It happens all the time in every workplace-workers are totally content and happy doing what they do, oblivious to, resisting or totally ignoring what the work role's functional parameters dictate they must do for the organization's work role yields. In fact, the worker can sometimes be generating extreme "functional" performance . . . in their opinion. The only problem is, they perform the wrong functions entirely, in the wrong order, with the wrong priorities, in the wrong sequence with, or in the absence of other critical functions. In fact, one could imagine a workplace that workers come to everyday and "do their own thing" (that is, they create their own Organizational Triangles or malformed Personal Value Propositions) and, as a result, the organization could be in terrible condition or even destroyed. This can be one the underlying lurking problems with "engagement surveys," "morale studies," and affinity programs in the absence of WRYM. Thus, PERFS relates directly to the pursuit and achievement of prescribed functional performance in a given work role, whereas flow, per se, from an individual's perspective, does not.

The key to PERFS is designing work roles such that workers defined and specified to be "qualified" will predictably realize a sustainable state of Flow in the work role and its ecosystem. This predictive design specification is achieved through the aggregate research and modeling of functions and their collective utilization and capa-bilities models, which lead accurately and precisely to a worker's "performance experience." Then, candidates must be effectively assessed or appraised to determine if they possess those attributes.

Whereas the organization cannot dictate flow to any person, candidate or worker, it must always strive to leverage people's flow through PERFS if it is to realize peak performance and affinity/retention. The work role experience for a person can be designed to best attract and hold qualified workers in that role. If this is done proficiently and precisely, the worker will realize flow in that role, and the organization will realize the best of all worlds in functional performance.

PERFS is the way to approach these aspects of work role architecture in WRYM. PERFS provides a way for organizations to predictably place people within work roles that will realize a personal state of flow as they perform their functions within that work role's ecosystem. Flow is intrinsic and subjective in nature, as it belongs to the personal domain. Only individuals can define their "states of flow." Equally, one can think of PERFS as extrinsic and objective, as PERFS is intended for application by an organization that is by its nature external to the worker as it attempts to match work role conditions to correctly specified workers placed into that role. However, the basic geometry of the PERFS framework is the same as flow, and the three "zones" have similar descriptors for they represent the same personal realities and underlying organizing principles. In the Work Role PERFS Framework, as in the flow framework, there is an optimal zone with problematic A and B-Zones to each side of it, proportional to the type of misalignment between the person's attributes and the role's attributes represent worker conditions as they function within a work role.

Figure 18:
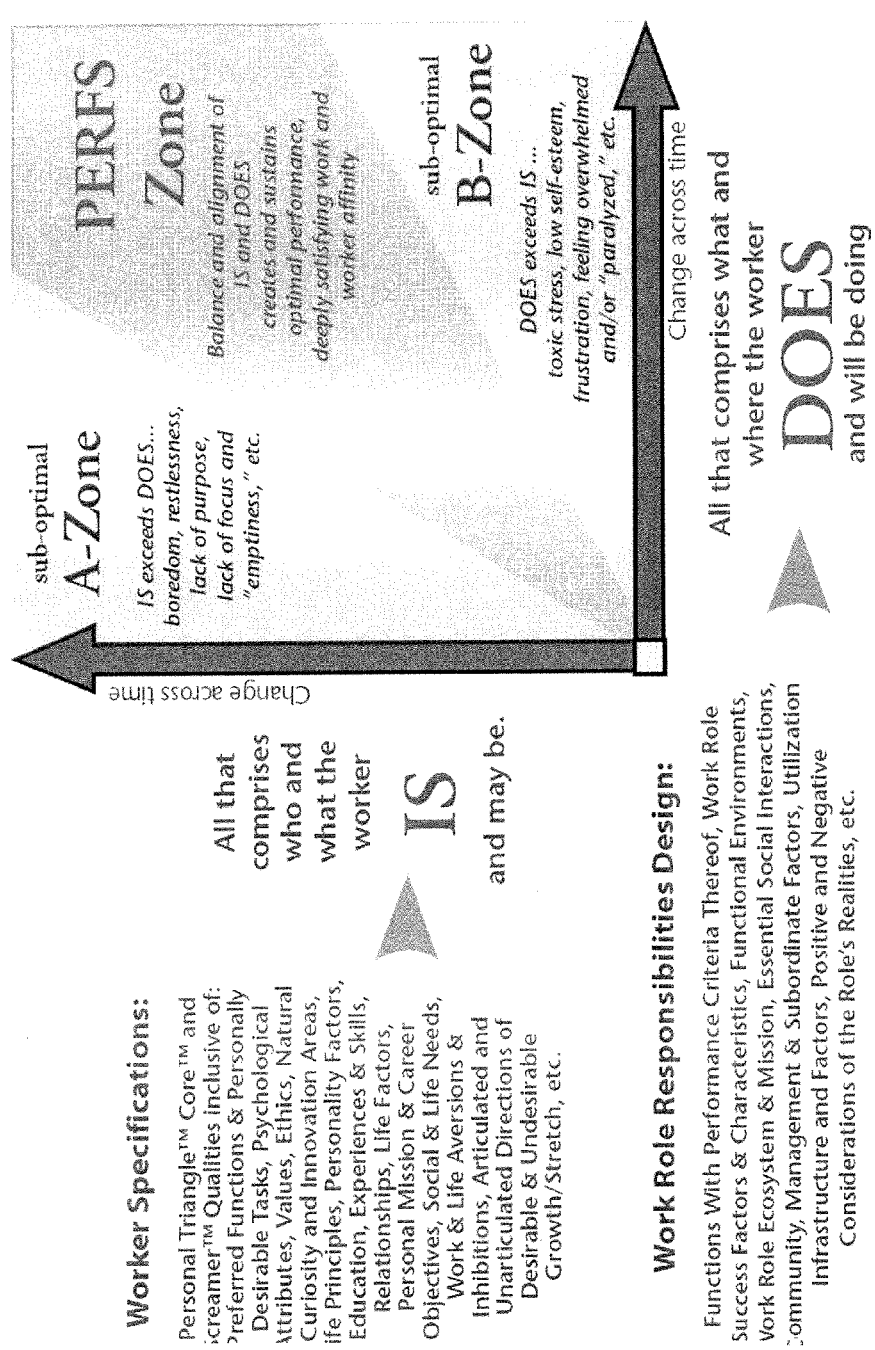
FIG. 18 shows the Work Role PERFS framework in accordance with one embodiment of the subject invention.
Figure 19:
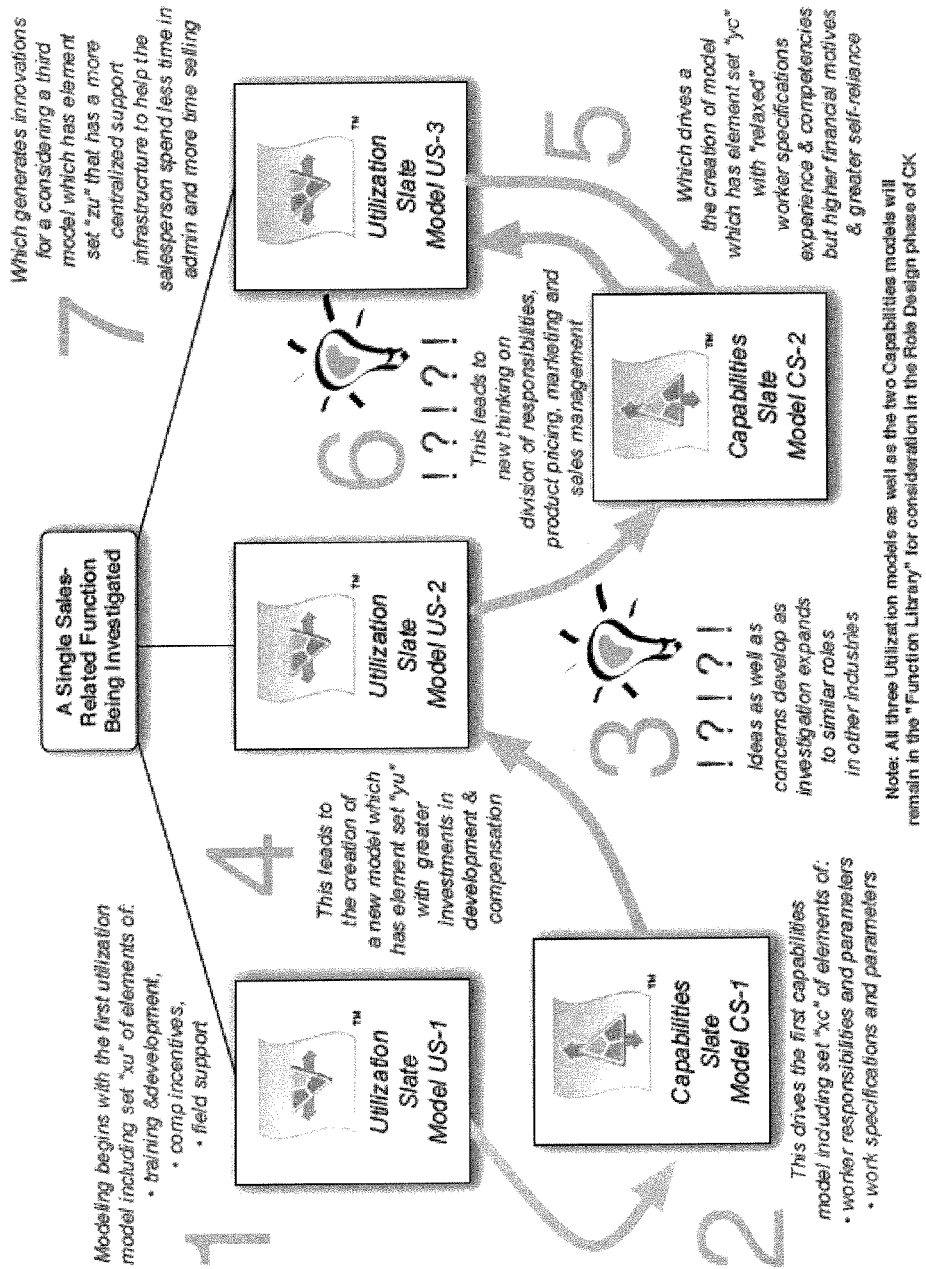
FIG. 19 is a diagram of a rpSlates modeling iteration scenario in accordance with one embodiment of the subject invention.

FIG. 18 shows the PERFS Framework. The "reductionism descriptors" along each axis of the framework are "IS" and "DOES." This reflects a third-person perspective and reminds that from PERFS one views framing and design extrinsically and objectively from the outside. There is also more content with each to remind the user to consider not only the present circumstances, but also to design for applicable aspects of the future.

"IS" describes "worker specifications." It is the work role designer's objective to correctly specify the worker qualities and attributes for the work role with increasing precision. There are two immediate cautions here that relate to conventional meanings and usages of the term specification:

(i) The reference to worker specifications is not meant to dehumanize work, but instead encourage more thoughtfulness in work role design to make the work much more suitable and satisfying to the type of person placed into the role. Thus, the accurate specification of workers as cast into a work role actually serves to "humanize" the work for the benefit of the well-chosen worker as well as the organization.

(ii) Worker specifications need not imply an attempt at "cookie cutter" or "cloned" approaches to worker selection. There may be some cases in which one becomes so knowledgeable and precise about essential worker typologies that one indeed desires to repeat the same formula for success. However, in most cases, worker specifications should be designed to specify, manage and maintain a very beneficial diversity in the placement of workers in the role.

There is seldom a case in which a variance in degrees of diversity (thinking-style preferences/aversions, personality and emotion factors, gender, race, culture, age, etc.) does not benefit overall performance and make for more resilient and responsive workforce dynamics. Additionally, designing diversity into worker specifications actually allows the organization to enjoy greater creativity and to "experiment at the fringes" to find new paths to greater yields, often by blazing new trails in PERFS. One should keep in mind that often diversity factors are normally an important part of PERFS to other workers (with positive and negative implications). In fact, sometimes there is merit in different work role designs to achieve the same yields and functions. This ensures addressing the full diversity needs of the different types of workers by designing "roles" to suit their and the organization's needs in functional performance. Another approach is to design and apply "variances" within a work role blueprint to gain the diversity you desire. Worker diversity is typically the more difficult and demanding path, but, if approached thoughtfully, it is also the most rewarding.

"DOES" describes "work role responsibilities design." This does not say worker responsibilities. In WRYM, this distinction is very important, for it is the work role that has its clearly-designed responsibilities, which then enable one to clearly and cleanly differentiate the worker from the role, and, thus, precisely specify the worker qualities needed within the role. All too often workers are simply assigned responsibilities or assume those that are simply incorrect for them. Then the problems, dissatisfaction, and losses emerge. This can happen with an astonishing amount of arbitrariness in many workplaces in the absence of WRYM.

In work role design, one cannot specify a worker unless you know the combined set of responsibilities of the work role, both the responsibilities that will be provided by a person as well as the responsibilities of the organization. To design and proceed otherwise would be like purchasing and installing an office printer or copy machine without any consideration of the responsibilities (duties, scope of needs, or requirements list). One must understand the needs as well as the operating environment before one can specify and purchase the device. Sadly, though organizations can be brilliant in the procurement of machines and supplies as well as placing them into functions, they often can be rather pitiful in following such a prudent model with people. Yet, they express surprise at the rate of breakdowns and exits.

The caption within the PERFS Zone expresses the objective of good work role design, while the A and B-Zones express the dangerous areas of relations that the work role investigator, designer, and/or architect seeks to avoid. These differences may seem minor, or mere "play on words." However, a solid grasp of the PERFS framework is critical to fully exploiting the power of WRYM.

FIG. 11 shows how the components and PERFS fit together. It shows the principle components of the WRYM "Nested 3-D" work role framework. By the nature of organizations, work and people, all of these principle components are dynamic realities, with or without WRYM in place. WRYM helps one to understand these realities as well as the motions, shifts and changes so as to cause improvements and repair problems. Organizational work role objectives, or yields, are generated by functions. Functions are derived and created from areas of critical metrics as individuals and organizations execute and improve the work role to gain the yields sought. This single graphic can be applied by all astute WRYM practitioners as "fast facts" or "quick starts" used to diagnose, design and place a specific work role into a specified life with accuracy, precision and desirable results. As in all powerful knowledge constructs, this simple graphic has infinite depth and endless creative possibilities in application for each work role as well.

FIG. 12 shows another view of the full "Nested 3-D Work Role Framework." WRYM work role hierarchy symbols as shown therein are described as follows:

PERFS 100 is the investigation and design realm pertaining to:

a. The optimal performance experience providing a high probability that the worker will be in a state of flow while doing the functions an organization needs within the ecosystem the organization provides to achieve optimal performance from the worker and optimal satisfaction for the worker.

b. Understanding the possible spectrum of worker experience factors in the work role and its ecosystem as well as how these might be related to worker typologies, capabilities and specifications thereof.

Personal Work Role Capabilities 102 relates to Personal Triangle factors only. The Personal Triangle is the primary symbol, for it is the source of personal responsibilities and worker specifications for a work role. The secondary arrow symbol is underlaid to communicate the range of personal capabilities and qualities to create functional performance. Double arrows indicate that both positive and negative capabilities should be considered.

Work Role Utilization 104 relates to Organizational Triangle factors only. The Organizational Triangle is the primary symbol. The secondary arrow symbol is underlaid to communicate the range of the responsibilities of an organization to gain functional performance. Double arrows indicate both positive and negative organizational considerations.

Work Role Functions 106 combine the many aspects of utilization and capabilities to generate performance.

Work Role Yields 108 is the "nested" Organizational Triangle within the Personal Triangle. This serves to remind that one gains yields by placing a role into a life, not vice versa. The Work Role Yields symbolized are the organization's yields, yet personal yields must be provided in order to best obtain those yields.

Figure 20:
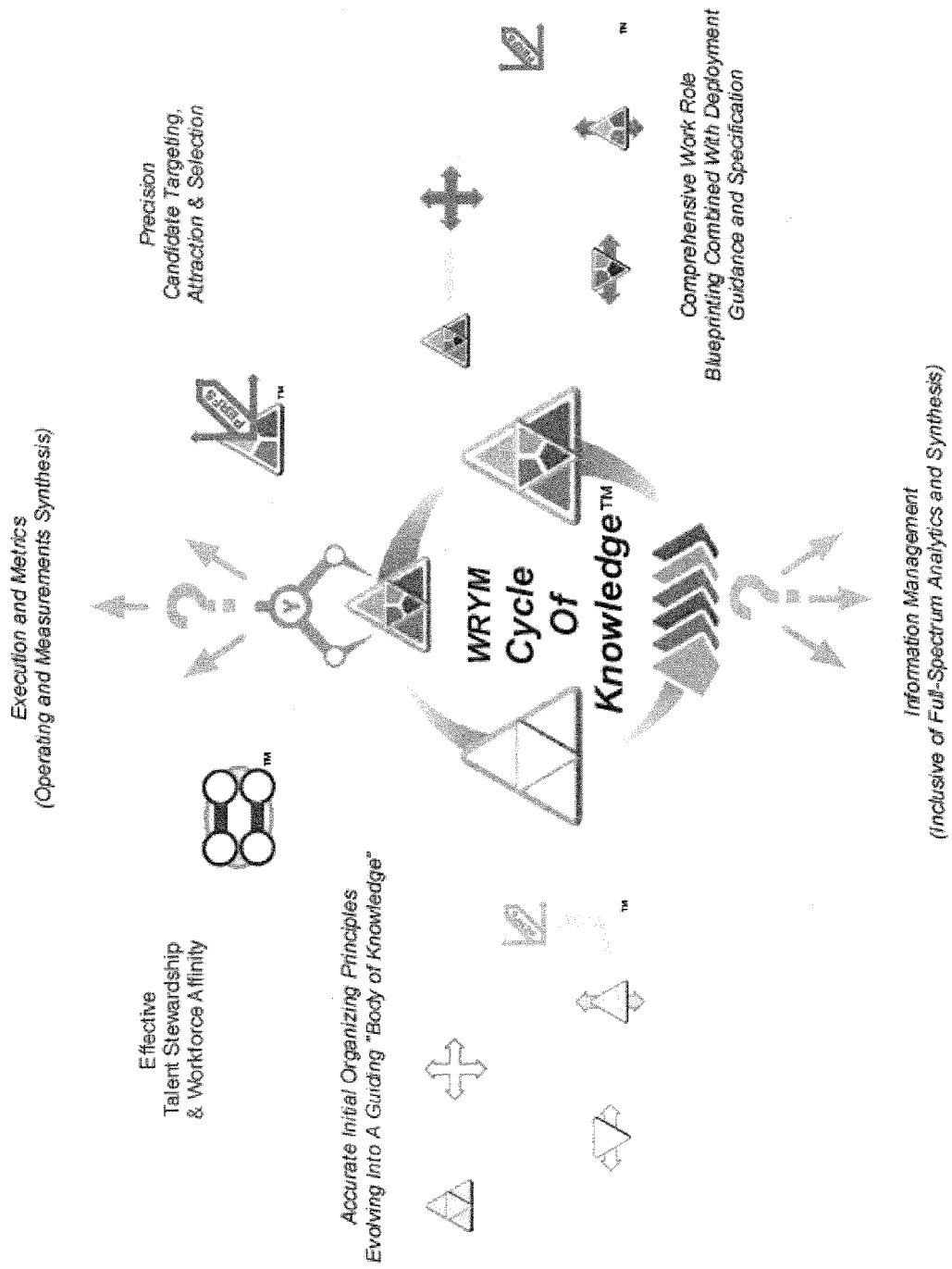
FIG. 20 is a schematic diagram of the WRYM Cycle of Knowledge in accordance with one embodiment of the subject invention.

The 3-D Nested Model can be placed into the Cycle of Knowledge (CK), as shown in FIG. 20. The 3-D Nested Model should be complete before proceeding with CK. This is especially true in the Information Management phase, for the 3-D Nested Model provides full topography of the landscape to be surveyed to decide the best possible work blueprint in the following CK phase. FIG. 20 introduces the full representation of an embodiment of WRYM's CK process.

The Guiding Knowledge elements provide the "structure," whereas the information obtained from Information Management provides the actual content or substance for your work role. During Role Design, content is added to structure to provide a complete blueprint for deploying a WRYM work role.

At the "north and south poles" of CK, question mark symbols with arrows pointing in different directions serves to remind the user that while query, observation, measurement and investigation are parts of both the second and the fourth phase, one is performed "downward" in analysis while the other is performed "upward" in synthesis.

Deployment aspects are represented with pertinent symbols for each: Work role candidate attraction (Flow via OT) and work role candidate selection to accomplish this; and work role stewardship.

Research-based WRYM investigation may be accomplished with "rpS&C Tools." rpS&C (rpSlates&Composers) is a proprietary form of software database application, developed and configured for the WRYM practitioner to explore and apply most aspects of CK. The software suite of rpSlates&Composers tools are the primary research instrument for the user, and provide necessary structure and documentation. Slates are used to capture, configure and establish various attributes within each element of information. Composers are needed to provide entry and framing portals, assist in aggregation and holistic arrangements of work role information. The format and utilities have to be aligned and consistent with Relationship Performance's frameworks, principles and CK processes.

Figure 21:
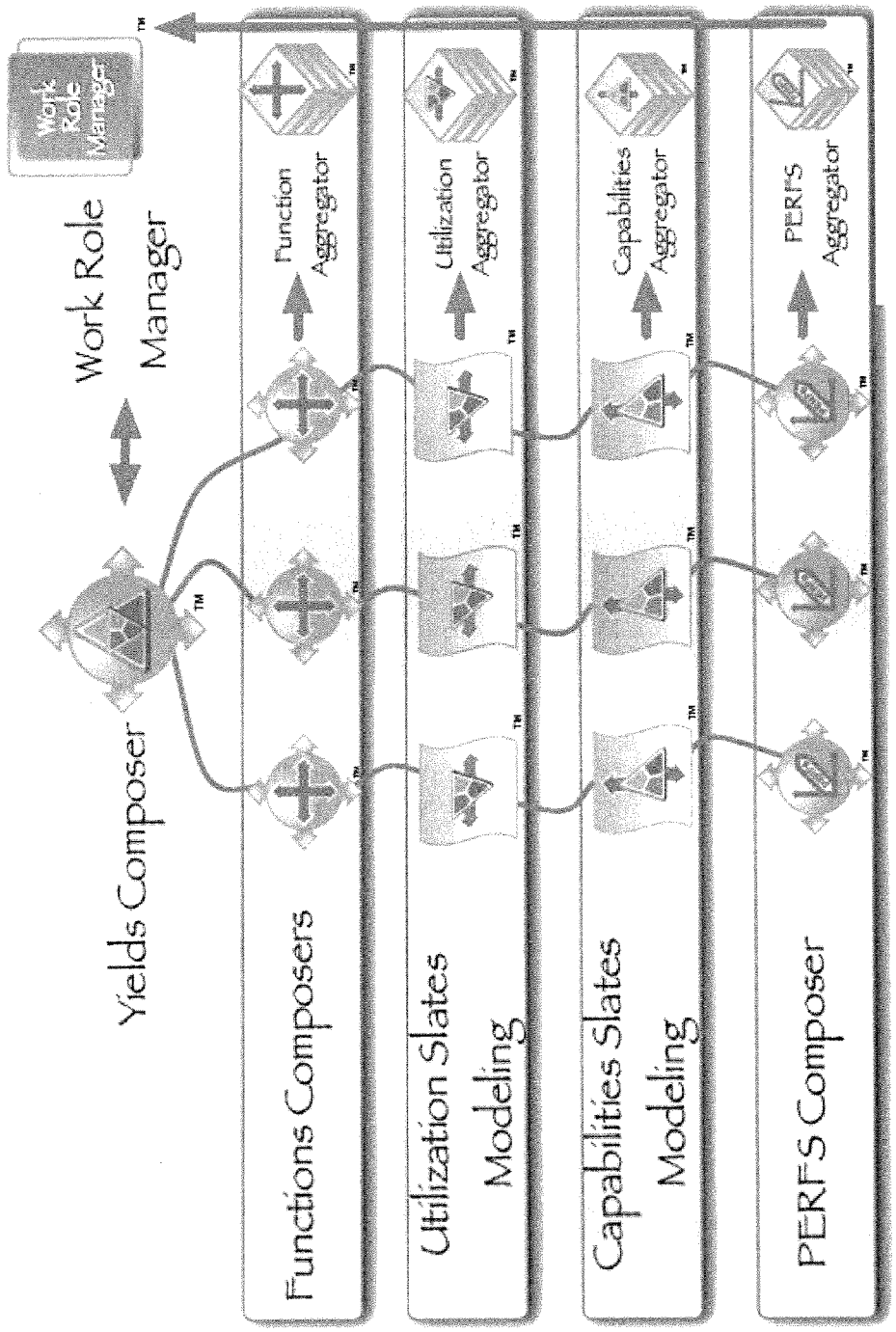
FIG. 21 is a diagram of the basic configuration of the rpSlates&Composers system in accordance with one embodiment of the subject invention.

The basic configuration is shown in FIG. 21. In one view, rpS&C might be seen as many individual databases or a meta-repository of information. rpS&C is constructed upon the 3-D Nested Framework, so the user always has the structure of Guiding Knowledge in place by the nature of rpS&C design. In fact, rpS&C's fundamental architecture is the 3-D Nested Model.

The Work Role Manager is where the role is generally "administered" and managed access to the Work Role Design, applicable recruitment, stewardship and measurement blueprints reside here. Generally, most detailed and specific information is captured within the Slates environments. Slates are intended to be the primary venues for placing all the "parts" of the work role as one performs analysis and adds considerations, data, concerns and discoveries. Slates will be used for both utilization and capabilities information. Slates are for analysis.

Composers are "compositions" to guide how to envision, appreciate and "break apart" holistic subject matter. Composers also serve as perspective doorways and thought-framing thresholds into certain domains of work role information. Equally important, composers allow one to assemble and translate information into greater, higher level, assembled, aggregated, ranked or distributed into unified composites of information. Composers are for synthesis.

rpS&C, like WRYM, is role-centric. That is, each "saved file" represents what the user defines as a discrete work role. rpS&C integrates all phases of CK for the WRYM practitioner. In other words, every utility needed for Information Management, Role Design and execution in Recruitment, Stewardship, Measurement and Refinement are in place throughout rpS&C. rpS&C becomes the Work Role Knowledge Repository or library to store what one knows and learns regarding the role. It is designed to be the central place where one continuously inserts and considers data, information and knowledge about the role.

As such, the user may have the freedom and discretion to determine what phase he or she are in as they use rpS&C for a given work role. This freedom brings with it certain dangers and a need for discipline. rpS&C is an open, non-linear environment, like most software applications. Therefore, each section and segment may be used as wished, and in the order that the user desires (although, as a practice, most users will have a certain sequence or manner that you find most comfortable). rpS&C adapts to the user's style, methods and approaches to information management.

rpS&C is designed to structure work role inquiries, provoking deeper thought, broader perspective, and to provide a repository for permanent documentation and reference. rpS&C will be the structure as well as a "CK notepad" as one investigates a work role.

In one exemplary embodiment, a user may use rpS&C as follows:

A. First, one will set up the work role identification, description, summary information and rights information (as presently known to be) in the Work Role Manager. This creates the "meta-file" one will use to manage the information concerning work roles and relations.

B. Second, in the Yields Composer, one begins to consider the Work Role yields desired as related to Organizational Triangle objectives. The user carefully considers the yields wished to be gained as well as the yields he or she wishes to avoid in this work role. At this point, only enough information to clearly identify and summarize each yield being considered is entered. Yields will be considered within the work role, worker relations, worker transition and succession, candidate attraction and candidate selection. Yields should also be considered in direct alignment with organizational tactics and strategies (such as financial, competitive and all other operational initiatives relating to this role). Yields will be synchronized to match the organizational design of other roles. Yields will address talent supply, demand and diversity matters. This area also addresses other yields sought in the context of strategies, team, communities, mission, markets, industry, organizational design and so forth surrounding this work role.

C. Third, as the user assesses the functional requirements for each yield being considered, a Functions Composer is applied for each yield. Here, the user will identify functions that must be performed to best ensure that a particular yield is realized or avoided. At this point, only enough information to clearly identify and summarize each function is entered.

D. Fourth, as the user begins to consider a function, he or she will use the Utilization Slate to evaluate and investigate utilization parameters for each function. That is, what the organization must provide for a person to realize and dependably gain and sustain performance within the applicable functions. There will be a Utilization Slate for the user's use with each function that he or she is considering. As the user enters and establishes information within a Slate, he or she will have the option to begin assigning "attributes" (or in the taxonomy of rpS&C, "Smart Labels") for all the information and data. These Smart Labels will assist in many ways as the user moves forward. The user considers what must be provided for utilization to address all aspects of this function's Organizational Triangle.

E. Fifth, directly connected to each Utilization Slate will be an attached or underlying Capabilities Slate, which allows one to investigate and consider information about personal capabilities, competencies and other qualities while you are considering utilization factors. A Capabilities Slate is somewhat similar to a Utilization Slate, but it is designed entirely around the Personal Triangle factors, contexts and perspectives. Again, the user will have Smart Labels for additional identification of all applicable attributes to assist upcoming awareness and decisions. This Slate is where one considers how to best place the work role into a person's life and the nature and qualities of the "right lives" in which to place it. In most work roles, utilization and capabilities demand the need for compromise and careful balance. Some of this will be obvious at this stage of investigation and some may surface later.

F. Sixth, within the Capabilities and Utilization Slate will be linkage in the next phase to a PERFS Composer. Inquiry and discernment here will provide critical insights into how one must consider all the factors to select and steward a person. It will be imperative that a candidate/associate's personal capabilities generally reside within the PERFS Zone when performing all their functions. PERFS is an underlying worker specifications requirement; for either the person is capable or incapable of being in PERFS per your prevailing utilization and capabilities planning requirements. PERFS is a primary attractor for candidate pools, the central force for performance, as well as the best way to address worker retention and reduce a myriad of other workforce risks.

G. Finally, as the user constructs this body of "layered" information, high-level understanding about the work role yields, recruiting effectiveness, patterns of functional performance and talent stewardship will begin to emerge. The user is assisted in recognizing these patterns by utilizing the Aggregating Composers as well as the utilities that reside within PERFS, Utilization, Functional and Yield Composers.

Figure 22:
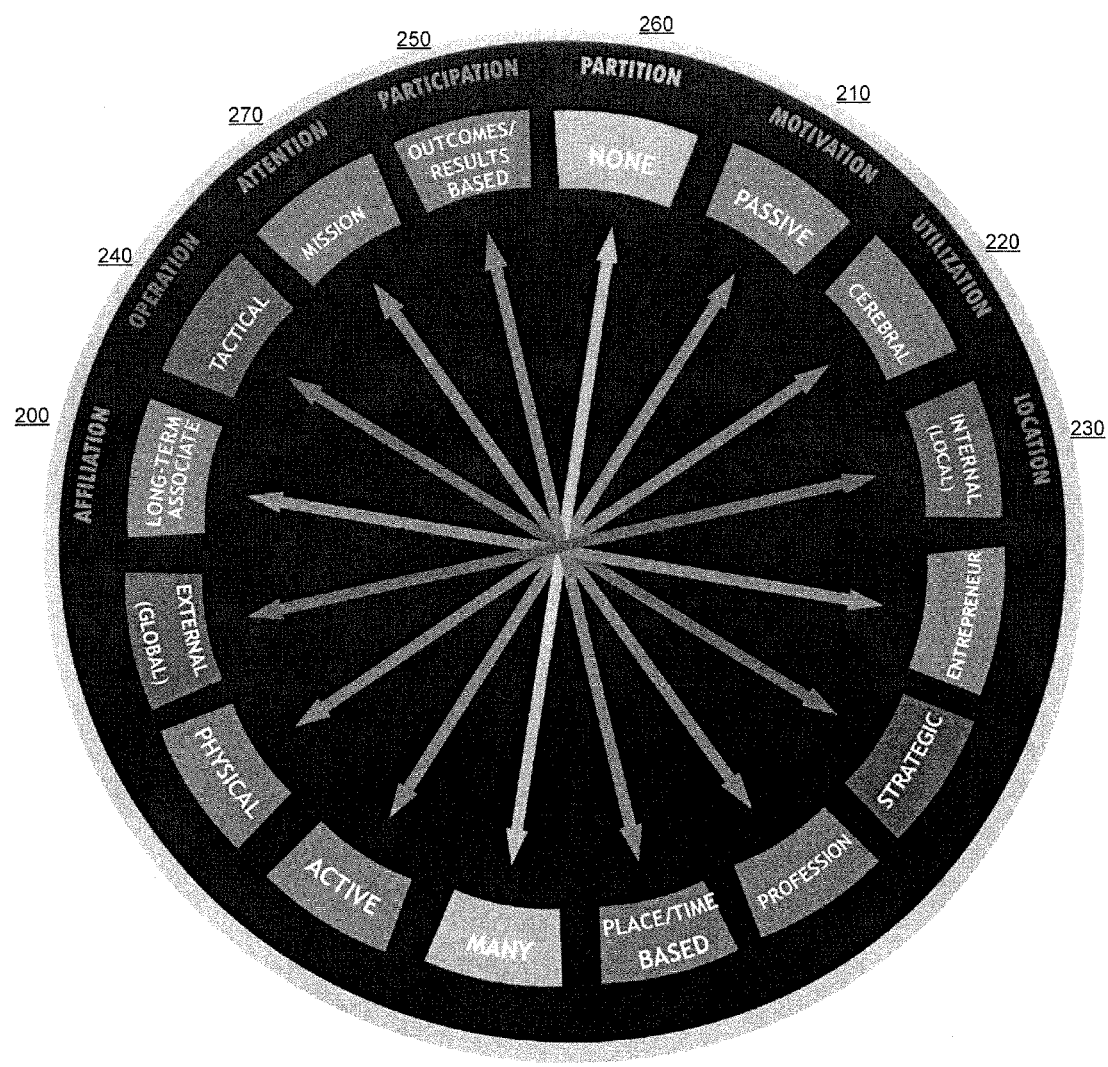
FIG. 22 is a diagram of the Eight Dimensions in accordance with one embodiment of the subject invention.

FIG. 22 shows the "Eight Dimensions," which is a framework for the individual to help present himself or herself in a more creative, flexible, and powerful way. Each of the Eight Dimension may be related to every part of the Personal Triangle as well as every part of any Organizational Triangle.

Affiliation 200 is the relationship of the individual with the organization. "Lifetime employment" is now assigned to the Smithsonian archives as a relic of the paternalistic industrial-age company. In human resources circles, "permanent" is even an illegal term. As many now say, "Today, all roles are temporary—it's just a matter of how temporary." Now, when one is affiliated with the organization and the organization with the individual, the economic relationship exists only while each of the parties continues to provide attractive value to each other. Yet, today the nature of that relationship, the depth of the "reciprocal commitment," and the structure that connects the individual and the organization can all vary greatly.

Treating the "structure" as a variable can be a major advantage for both parties. The nature of the affiliation is highly negotiable and fully situational. The relationship can be defined in ways that are optimal to the tasks and functions at hand as well as proportional to the creativity of both the individual and the organization. One may also choose to define affiliation so that he or she are directly affiliated with an intermediary who then sells the individual's talent to another organization.

Many are still uncomfortable exploring an affiliation with an organization in a manner outside the conventions of industrial history. They want a paycheck, a salary and a "job description." However, this thinking severely limits opportunities. It prevents individuals from being open to other ways of economically relating to and bonding with an organization. It will be a symbiotic relationship structure that ultimately leads to the outcomes desired by both parties.

With this in mind, as shown on the one end of the Affiliation continuum in FIG. 22, one can still be quite conventional in a long-term relationship with an organization; i.e., be on the payroll and remain very structured in the affiliation. However, more and more people are rethinking conventional forms of affiliation in order to gain the lifestyle, quality of life, experience, increased variety or the income they desire. Growing numbers of people are electing to have contracting, consulting, freelance or other forms of interim relationships with organizations. In many of these cases, people are seeking composite roles, having more than one role at one or more organization(s) simultaneously. At the other end of the continuums, many are going their own way(s), blazing new paths as entrepreneurs, and in doing so are creating and building their own organizations.

Some of the options that might be considered include counseling, consulting or contracting independently (directly to others). This requires continually marketing oneself as well as invoicing oneself. This form of relationship is becoming increasingly attractive to many in the marketplace but the simultaneous requirements of performing and marketing can be challenging if done separately. On the other hand, if those options do not offer enough structure, security or stability for your personality or situation, or if the individual does not like the thought of constantly marketing and invoicing for services, then the individual might consider becoming part of a consulting or contracting group that brokers and administrates—often making available to the individual resources, networks, a customer base and knowledge capital that he or she might be hard-pressed to amass individually.

Consulting and contracting talent through others often takes two very basic, yet different, forms. Since each form also can have many variations, the dividing lines between the variations are sometimes blurred. One form is the event-based or transactional brokering of your talent. In these instances, an entity, often a talent staffing company such as Manpower Professional™ or Robert Half International, markets the individual to organizations by selling categorized professional talent for either a project or a period of time, then they pay the individual directly while invoicing their client. The talent offered by them can include programmers, accountants, engineers, nurses, scientists and even executives. Often, this type of affiliation gives the advantage of a degree of choice in the roles you can accept, and an individual can gain a wide variety of experiences in many different operational environments. In addition, one can often choose when they want to work. In this type of construct, the affiliation is directly with the staffing company (or sometimes more than one), that then places the individual in its client's organization, usually for an interim or moderate time period.

Another approach is to have a more perpetual affiliation with a "talent and intellectual capital brokering intermediary" or a "talent aggregator." Here one has a long-term and continuing affiliation with the intermediary, and accordingly is then placed in service to a variety of its client's organizations—sometimes one can even be embedded into its client's operational environments. Examples of this type of intermediary are Accenture, EDS, Price Waterhouse or McKinsey, more specialized small "boutique consulting firms," many law firm partnerships, health-care partnerships and so forth. In all these situations, almost endless compensation arrangements and relationship structures are possible. Many can be quite flexible and adaptable to the needs of one's Personal Triangle.

Beyond these more traditional forms of affiliation are many emerging forms in which individuals organize collectively to bring "total talent solutions" to organizations in the form of partnerships—similar to the way lawyers, doctors, mature consultant agencies and architects have offered their services in the past. Often, these "collective" partnerships themselves become a self-organizing form of "talent aggregation," providing turnkey solutions in areas such as product design, website services and advertising. These may be referred to as "collectives."

Further, in today's world there are new forms of emerging franchisees, cooperatives, guilds and syndicates that let one be quite independent, much like a pure entrepreneur, yet have the support systems and community affiliations that may be important to success with organizations, and provide an attractive path to personal fulfillment. In many cases, one can even blend several simultaneous affiliations into your career paths. For example, one can have composite roles with multiple companies involving a variety of simultaneous affiliation structures.

The trick is to periodically consider what is right for oneself at this stage of life, what best suits the needs that defined in the Personal Triangle, and the needs that the applicable organization may have at the moment. It is occasionally possible to modify the affiliation structure within the organization with which one is already affiliated when it would be optimal for both parties. Keep in mind that organizations are increasingly more interested in performance-based compensation and agreements (often paying more to keep "risks" low and "investments" proportional to "outcomes"). Therefore, incentives, bonuses, commissions, equity/options and other outcome-related compensation can be used to give both the individual and the organization the financial incentives that meet both parties' respective goals. All of these are simply variations on this Affiliation dimension.

Moving between extremes on this scale from "entrepreneur" to "long-term, payroll associate" is an excellent way to propose to reduce the organization's perceived risks in their Organizational Triangle. When one is confident in his or her ability to deliver, this is also an excellent way to get the attention of the "passive" organization (described below with regard to the Motivation dimension). In other words, one can "make them an offer they can't refuse" by using this dimension combined with the Participation dimension, and propose to the organization that they can have a relationship on both a trial and an outcomes/results basis.

The Motivation dimension 210 is an area where countless prospective opportunities may be lost. Individuals often limit career possibilities by seeking only those organizations that are actively seeking to "fill a position." People who decide to choose and pursue their own best destinies reach out, discern, define and attain the best roles in organizations—that have often been totally passive to considering or hiring new roles before they were contacted. To find the best roles, an individual must be proactive. This is a trait or quality that can be called "strategic resourcefulness." One should creatively and resourcefully seek roles that are right for that individual. You must investigate and discover. Great roles are seldom advertised.

In reality, an organization's needs vary dynamically every day, sometimes even every hour. The possibilities for the individual depend on how effective that person is in causing the organization to become an active buyer or investor in what they have to offer. Is the organization actively pursuing talent, or is the organization consciously considering adding talent? The former usually requires that an individual use competitive approaches to differentiate oneself, while the latter demands that the individual argue the compelling value of what he or she has to offer in a prescribed role. Perhaps the organization is totally unconscious and inactive in pursuing talent or "mining for talent-gold in the ore of daily activity" (usually because their attention is focused elsewhere). Very often organizations do not even think about the possibility that a new role could be created to meet their emerging or historical needs until they meet the person that leads them to that conclusion.

Armed with information in the Personal Triangle and with a well-thought-out, proposed Organizational Triangle, one can expand their creative thinking to visualize the many organizations where desirable roles may reside, even if the organization may not yet be aware of the need for the role that the individual could fill. In fact, the organization may be the one the individual is in already.

When one party is passive, the other party is best advised to be very active. That party often is the individual. This is one reason that organizations often use a headhunter/recruiter, a fully-dedicated, highly-skilled sales and marketing person tasked to uncover the people the organization seeks, wherever they may be, and convey the most persuasive story of the organization's opportunity. Headhunters are handsomely rewarded for success because often this is not easy to do.

The Utilization dimension 220, though unconventional, is loaded with possibilities and options, which through creative thinking can generate new perspectives on possible opportunities and roles. By their nature, work roles are made up of tasks, functions and responsibilities. Indeed, a role is an expression of the organization's functional needs that can be filled by a human being. What a role requires from the individual is some combination of mind and body. As one explores the Utilization dimension, a person will find ways to alter or expand the role's requirements to better use some combination of mental and physical capabilities, or by reexamining assumptions about how the individual will offer to apply mind and body to the role (the Personal Triangle).

This dimension may appear to be simple, but is infinitely complex in reality. Commonly, the mechanics of brain and body are grossly oversimplified, often purposefully so, in more than one way. In today's workplace, people often talk about work that either utilizes the "left brain" or the "right brain." People are said to have either physically-centered roles ("blue collar") or thinking-centered roles ("white collar"). Rarely is it that simple and in such a neat box. Everyone uses all parts of their brains in all situations and circumstances. Everyone thinks in their work. A salesperson or executive on a red-eye flight to the opposite coast to meet with a client uses a lot of physical attributes and stamina, just as a person fighting a fire or working in an emergency room does. People and their roles can no longer be categorized on the basis of the color of their "shirt collars" (white, blue, gray, etc.). People often underestimate and fail to consider how much of their minds and bodies they apply (or don't apply) to their work roles, and in doing so, are blind to present realities and to other possibilities that may exist as new role opportunities.

For the purpose of understanding this dimension, a user should think of three separate, yet connected, functional parts: the top part of their brain, the lower part of their brain, and their body. This method focuses the "north" half, or upper, cerebral layers and the "south" half, or deeper, limbic components of the brain. This is a general metaphor, not physiological science. Upper, cerebral functions mean higher-level "cerebral" thinking that often leads to analysis, reductionism, mathematics, synthesis, logic, holistic creativity, intuition, integration of information, imagination and curiosity. Lower, limbic functions mean the deeper, and some say older, more primal parts of the brain. These limbic functions serve in organizing, sequencing, planning, socializing, supervising, regulating, avoiding risks, structuring, administrating, sensing, safety-seeking, expressing feelings, emotions, empathy and also making "fight or flight" decisions.

The "physical" means the body, not just the muscles, limbs, fingers, feet and bones that do manual work, but also a greater, whole "limbed" vehicle that carries individuals (with their brains on-board) to where they need to be in order to do what is needed to satisfy the requirements of their roles. As a vehicle, the body has possibilities, and it has limits. It can move about as well as suffer fatigue. It provides energy, and it requires rest. Each body has parts that are developed, "tuned" and have undeveloped potential. They also have parts that are challenged, have limits and possess handicaps. This physical element of the Utilization continuum impacts roles and the choices made about them. Few who have "thinking roles" recognize how much they also need their bodies to perform well in these roles.

Some roles are highly cerebral, some are mostly limbic, some are highly physical. However, almost all roles require combinations of the three areas and exist to some degree across the continuum. Although some roles are centered principally in one or two areas of this dimension, others are evenly distributed across all areas.

Often, by moving in one direction or the other on the Utilization dimension from where one currently considers himself or herself to be, one can creatively explore and discover interesting opportunities. For example, consultants focus mostly on cerebral in activities, but they can often increase their income by adding a physically demanding travel schedule to their role. On the other hand, they can also choose to do less traveling if they increase the limbic dimension by moving to management, leadership, training, writing or support roles.

As with the other dimensions, there are abundant personal marketing opportunities for individuals through effectively communicating what they can offer to the organization and what they are enthusiastically willing to do for them along the Utilization continuum, meeting both the individual's needs and the organization's needs.

A few hypothetical examples of people who are proactively moving on this continuum are as follows:

1. A digital systems analyst/designer (a cerebral role) desires to increase her value to her organization and thus her income, by developing and moving into a management/leadership role (limbic). This will require learning and applying new skills in social interaction, business processes, policies and procedures, adhering to budgetary finance structure, risk management, coaching influence and motivation of people.

2. A security person (limbic and physical role) desires to find greater fulfillment by moving into private investigation of corporate espionage, a role that combines more cerebral, limbic and physical activities.

3. An architect (cerebral) who is frustrated with chronic capitulation and interaction with demanding clients (limbic), and who also desires to move to a rural area for the slower-paced lifestyle (the "Effects" of the Personal Triangle) elects to capitalize on existing knowledge of home construction by opening a home inspector business in a rural area (a role that now combines physical, cerebral and limbic functions).

4. A truck service technician (cerebral and physical) elects to explore his interest and career growth at his dealership by learning more about opportunities in customer relations (limbic) or sales engineering (limbic and cerebral).

The Location dimension's 230 value is rarely exploited. Roles exist not just "out there somewhere," but often all around the individual. Often the opportunity sought is right down the hall, in another division or team, one mile from one's home, or, in fact, even in one's home. Of course, sometimes a great role is waiting thousands of miles away with a global organization (perhaps even in another country) that may need someone to represent them right in their hometown.

Although people have and need a specific "location," organizations do not have such constraints. Physically, people can only be in one place at a time, but organizations, by their nature, can have a presence anywhere and be in many places simultaneously. Even a small organization may need people to serve them across the globe. There are no limits to how far an organization can extend its activities, influence and roles. An organization is formed, in part, because they need capacity that a single human can not provide alone. These needs not only include functional capacities, but "capacity locations" as well.

The Operation dimension 240 concerns the tactical and strategic. Most advertised and posted roles are tactical—that is, they represent an immediate need to deliver functions and tasks that are required for the company's business and operational success. Addressing tactical needs is what many seek to do for organizations. On the other hand, there are many very attractive roles that are more strategic, such as helping the organization address long-term technological, societal, management, marketing, legal and political issues in order to create its best future and to find, create and realize new products, services and business opportunities. Opening the doors to strategic roles allows individuals to address more of the "why" issues rather than strictly the issues of "what" and "where." Moving toward the strategic end of the Operation dimension also opens doors to participating in the organization's ecology, marketplace and future.

Often, by allowing oneself to be flexible to think, move and serve along the Operation continuum, an individual can make himself or herself most valuable to the organization and fill its perception of its short and long-term needs. Many times the company is so busy attending to tactical needs that it has not given any attention to strategic needs. Sometimes, especially in new strategic ventures, the exact opposite can be the case. In those situations, being able to offer a base in tactical and "bottom line" financial performance can be significantly appreciated.

The Participation dimension 250 is one of the areas of most radical change today. Certainly, many roles require individuals to be in, or participate at, a certain place, and often at or during a certain time. In the industrial and employment paradigms of the past, before someone reported to an assembly line position, construction site, desk or surgery room, they went to a spot and put a card into a time clock to provide empirical evidence that they were in the right place at the right time. In contrast, the emerging talent market does not always confine a person with these concerns, which can often be irrelevant to success and performance in the role. Increasingly, more and more roles are based only on success in outcomes, results and deliverables, instead of requiring someone to be in a certain place at a certain time for a defined period of time. Even further, many organizations are letting individuals choose the time they want to be at the required place by allowing flextime and other such arrangements.

As in so many of these dimensions, the Participation dimension is loaded with possible conflict and paradox. For example, many value "propinquity." In other words, many individuals have the need to work alongside others—working together in the same environment and enjoying the spontaneity and sense of intimate community derived from the work community's connection and intimacy. Many telecommuters who value interpersonal community have found that such a feeling of community is difficult to attain remotely. Even though these interpersonal dynamics inherent in a community environment provide huge benefits to individuals and to the organization, the sense of fellowship can be meaningless or counter-productive to some individuals. One must determine for himself or herself the type of participation that is optimal for both the Personal Triangle and the success within the Organizational Triangle.

The Partition dimension 260 can be a vital concept for managing life as well as forming the best relationships with organizations. The word partition is defined as: The act or process of dividing something into parts; or something that divides or separates, as a wall.

Work is an integral part of life. Work is not separate and apart from it. The concept of "work-life balance" presupposes that work is something that one does outside of their life. This is nonsense and can be a dangerous error in one's point of view. Life goes on 24/7, regardless of what one is doing or where and with whom. Work is an essential and very significant part of our lives and well-being. For some, components of their life's identity and elements of purpose are reflected in part through service and purpose expressed within work. Furthermore, work normally comprises a substantial portion of their lives. Thus in the context of this dimension, it is no small irony that many have unintentionally put a "false partition" in place with the concept of work-life balance. Unfortunately, this leads to many unintended problems.

This dimension of partition relates to all aspects of one's life, with work aspects being just a part of that life. Applying partitions provides the ability to divide life into parts just as walls divide houses and commercial buildings, keeping one part from imposing or intruding on the other inappropriately. Establishing any of life's partitions should be a well-considered option in any circumstance, work and beyond, to assist in the "ground rules" defined and understood by both parties. Partitions maintain clarity and prevent problems, frustrations and abuse of goodwill and good intent of others.

There are many examples of "segments," "zones" and "roles" throughout life that may merit and justify constructing and maintaining partitions in order to have the quality of life desired, enabling individuals to perform their roles well. Examples of some of these zones are:

Friendships, personal networks and associations
    Relations with spouse or special friends
    Parenting and our relations with our children
    Our relations with others in our family, such as parents and siblings
    Our workplace relations Our professional relations, which can be entirely separate from our work roles Our personal hobbies, means of recreation, pleasurable pastimes as well as the typical needs for personal "downtime" and "quiet time" to decompress from our other activities.

Sometimes partitions go beyond relationships and the list above, or are interrelated with other factors such as:

Time and your allocations of time

Privacy and protection of personal information deemed important

Personal finances and matters of money

Opinions, points of view, values and philosophies, such as religious beliefs and political opinions Information, in either direction, considered confidential or secret, that must be kept securely in its partition and not leaked to others.

As in the other dimensions, partitions are seldom simple and are always a matter of placement on a continuum. In this case, the continuum ranges from one extreme of "none" to "many" on the other end. Some see another continuum relating to partitions from "flexible" to "rigid." Some people live their life happily without any partitions. They allow all aspects of their life to blend into one big integrated "life soup." An example may be in a traditional family-run business, such as a farm or self-employed consultants working from home. Child care, work chores, giving attention to the spouse's and parent's needs and making business decisions all become one big fully-shared interrelationship brewing 24 hours a day, seven days a week. On the other hand, there are those that like to have every aspect of their life neatly and totally segregated, each part of their life isolated from others. For them, every part has its own place and time, with each being regarded as entirely apart, even alien to the other, as they do their best to "keep their worlds from colliding."

Just as in all of the other dimensions, there are no universal right or wrong approaches or answers to partitions. Simply, there are those designs that work best for each individual and the life desired, as well as for the work role and organization.

The Attention dimension 270 is used in a special manner to reflect the narrow or wide range of where one places his or her focus, hence their attention, while serving in your work role. At one extreme of this dimension is mission or greater purpose. When a person has their attention to the mission of their organization or the greater purpose of the group, team or community in which they work, they put their energy into meeting the needs and dictates of the larger agenda, whatever that may be. A person that is mission-focused tends to have an interest or curiosity to continually learn better means to serve the needs of their group or organization's mission. They keep up with happenings, news, innovations, competition and other forces that may be acting on the nature of the mission, be it positive or negative. A person whose work role is at the extreme "mission" end of this continuum will put the mission foremost in his/her heart and mind, typically with passion and enthusiasm, performing numerous professional functions to achieve the mission's objectives. In fact, if a person's attention is on the greater agenda, they often treat their profession and skills as variables, doing whatever it takes to serve the agenda. Many great leaders, coaches, public defenders, soldiers, educators, healthcare professionals, clergy, politicians, entrepreneurs, public defenders, researchers, non-profit executives and the teams around them are often very mission-centered people. But anyone in any industry can be mission-centered in any role or profession. Many citizens of Japanese organizations are traditionally known to be mission-oriented, as are many workers in the US and around the world serving the purpose of their large or small organizations over long periods. Those who are quite mission-oriented have roles and career tracks that are dynamic and fluid to serve the best interest of the corporate agenda. Mission-centered people are normally not passive bystanders to the agenda at hand. Quite the opposite, they are deeply engaged in the purpose and often participate in a variety of roles and in every way they are capable and qualified to perform. The mission or greater purpose can be related to the organization or community that one belongs; their market, service or basis of need; their industry or that which is greater than their community. In almost all cases, mission and greater purpose is greater than any one person and spans substantial time in its accomplishment of objectives.

At the other end of the continuum is the "professional" or "craftsman." This is the person that puts their attention to becoming better at their profession. Their profession drives their interest, curiosity and enthusiasm. They approach the functions they perform with a passion that often brings them to the level of mastery. These "professionals" tend to stay current with the latest news in their professional sectors and communities. They often are quite active in their associations and regularly attend relevant conferences that serve their profession. People centered in their profession often consider organizational missions as transferable or interchangeable. Indeed, they may be considered mercenaries, and in some ways they are, for they bring their expertise and competence to whoever offers them what they are seeking at the moment in personal fulfillment. When their "price" is met, they serve well and everyone benefits from their professional strengths. If a better opportunity comes along, they can instantly leap to the new setting (and new mission). Attorneys, accountants, consultants, mechanics, pilots, database administrators, engineers, Web masters and IT professionals are but a few that sometimes find deep satisfaction in the professional area. Somewhat like expert nomads, they are ready to serve whoever has a need for their expertise, competences, knowledge and experience. At the extreme edge of the continuum is the professional or craftsman that puts their full attention to being the best at their professional role, with any mission or greater purpose, if relevant at all, being considered secondary.

In many workplace or institutional situations, circumstances dictate specific role requirements about how one views and what one knows about the mission, and conversely, a very large number of roles demand strong professional qualities or even professional certifications and licenses. As in the other dimensions, it is important that one understands where they are the most satisfied in placing their attention within the work role. It is equally important that they understand how the organization sees this continuum for their role. In some cases, it can be challenging to make major shifts in this continuum "overnight." Often this is because the Attention continuum relates to deep-seated personal preferences, traits, values or points of view.

This continuum may seem especially fuzzy and hard to grasp or accurately quantify in the beginning. However, many career problems and work role failures originate in the inability to understand one's self as well as one's work role in this dimension. Problems in this dimension can "sneak up on you and bite you" without warning, regardless of where one is on the continuum, if someone and their role are mismatched in this dimension.

Figure 23:
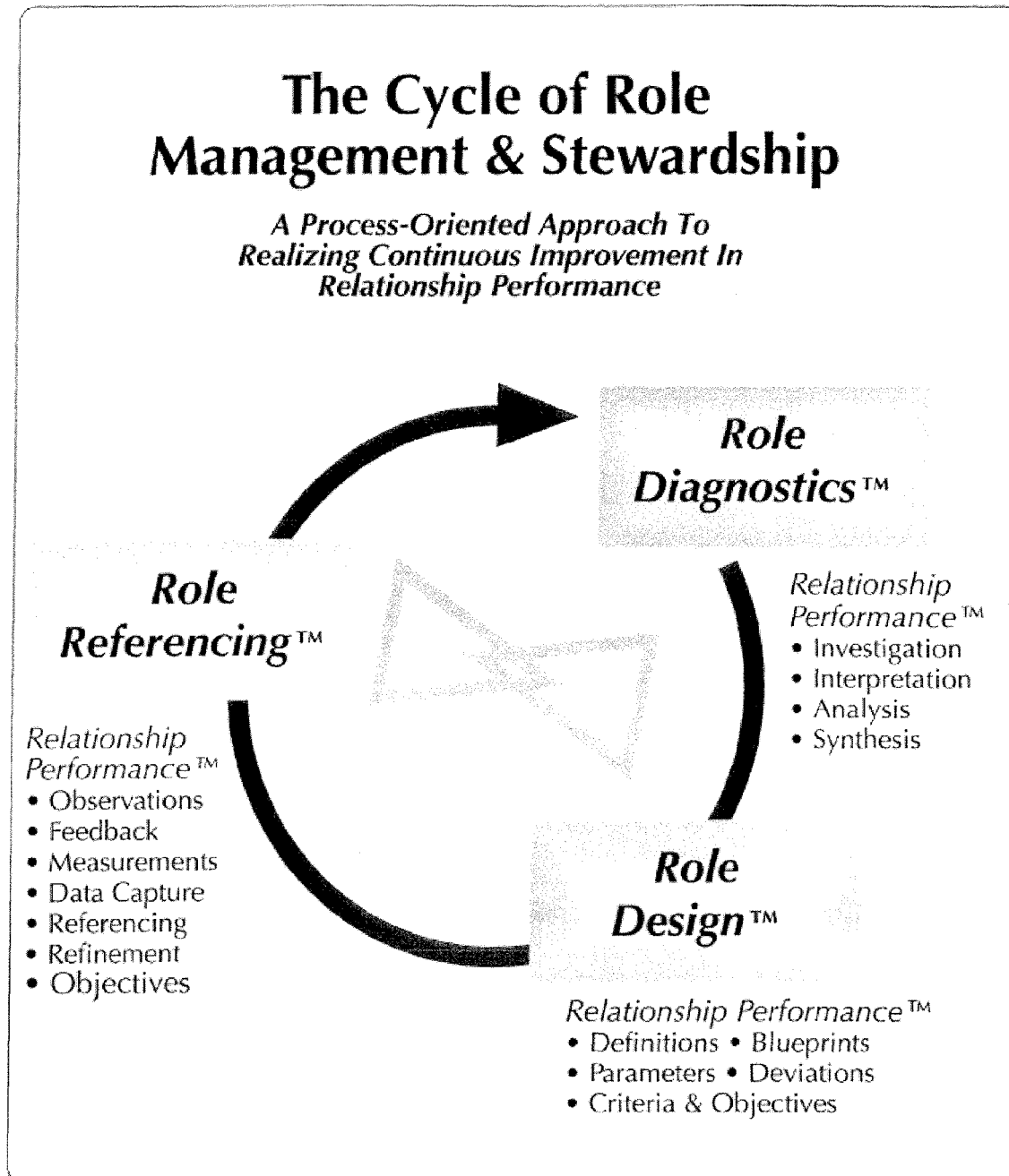
FIG. 23 is a diagram of the cycle of role management and stewardship in accordance with one embodiment of the subject invention.
Figure 24:
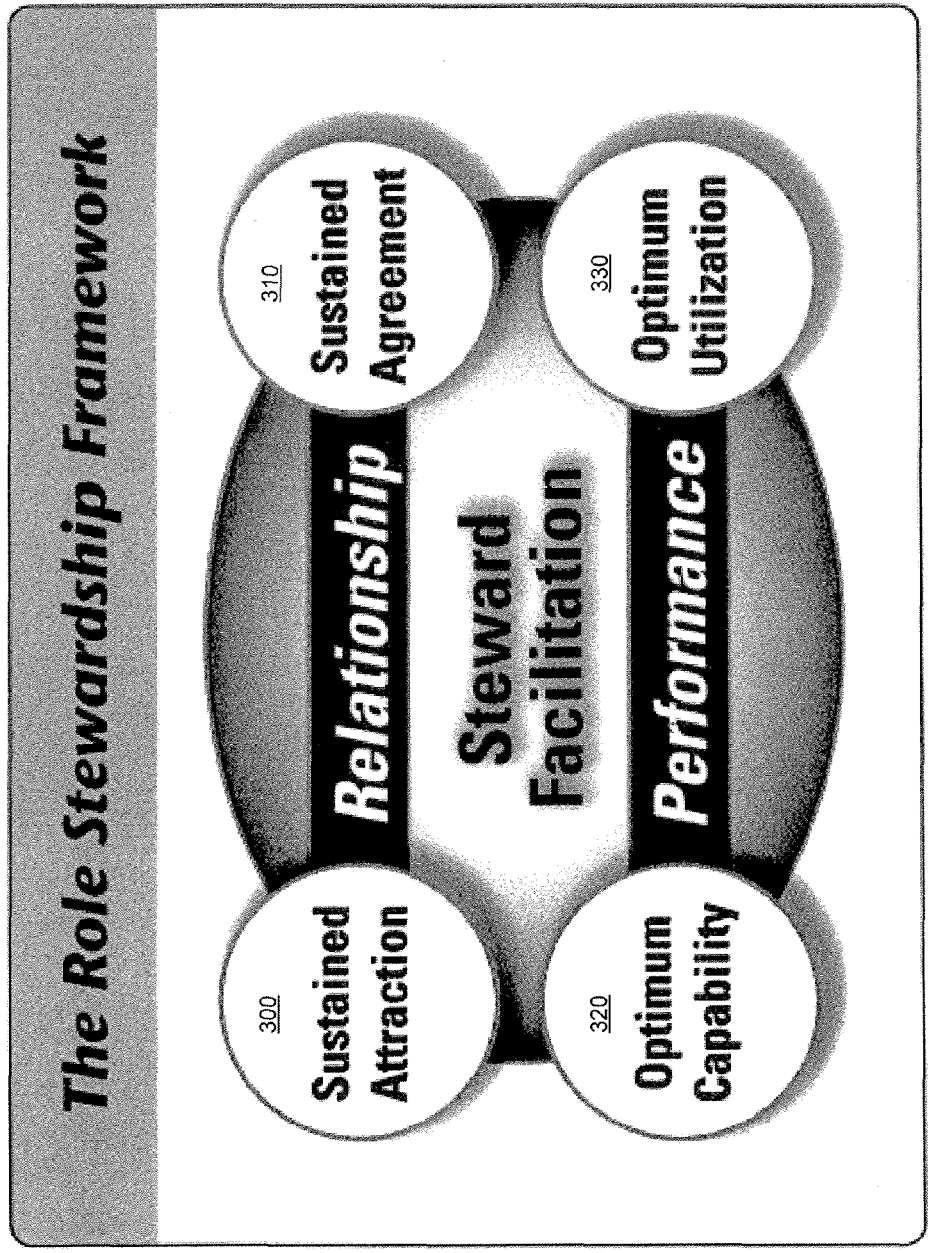
FIG. 24 shows a Role Stewardship Framework in accordance with one embodiment of the subject invention.

It is often overlooked that there are individuals inside the organization who are managing the relationship of various individuals in their roles. The TalentSteward framework, as seen in FIGS. 23 and 24, shows the cycle of role management and role/talent stewardship. It is a process-oriented approach to realizing continuous improvement in relationship performance. As seen in FIG. 24, the stewardship framework comprises four areas: sustained attraction 300, sustained agreement 310, optimum capability 320, and optimum utilization 330.

Attraction 300 is defined as the predictability that each respective party will perform in the best manner to the other's expectations compared to all other options and choices available to each in workplace relationships. The steward accepts primary responsibility in ensuring that they and the organization are most attractive to satisfying the needs of each person they have or seek in each role. Likewise, the steward must clearly define when they deem to be attractive to the organization with regards to expected performance in each role. The steward puts the previously described frameworks to work continuously in order to diagnose, define, measure, evolve and refine attractiveness to the degree the role demands.

Where attraction is the energy or the force of the workplace relationships, agreement 320 is the bond or cement of reciprocal understanding and commitment of the two parties. As shown in FIG. 18, the word "relationship" connects attraction and agreement. Both should be in place for the most successful workplace relationship. Agreement is a complete understanding of what each party expects of the other and how each anticipates performance from the other, in all contexts and dimensions that are applicable.

However, relationships alone do not provide or produce performance in work roles. Each party also must be capable 320 of performing for the other. When a role steward considers a person within a role, they must carefully consider the qualities, attributes, skills and competencies that encompass the full scope and scale of the role. The role steward examines all corners of the Organizational Triangle for the role to help make this determination.

Capabilities alone, however, do not give either party performance. Utilization 330 is where the "rubber meets the road." This is the actions and the results that deliver the performance that both parties seek. This is where the reason and the purpose for the workplace relationship are either realized, or they are not. Capability is the latent potential side of performance, whereas utilization is the kinetic realization side of the potential within the relationship.

Figure 25:
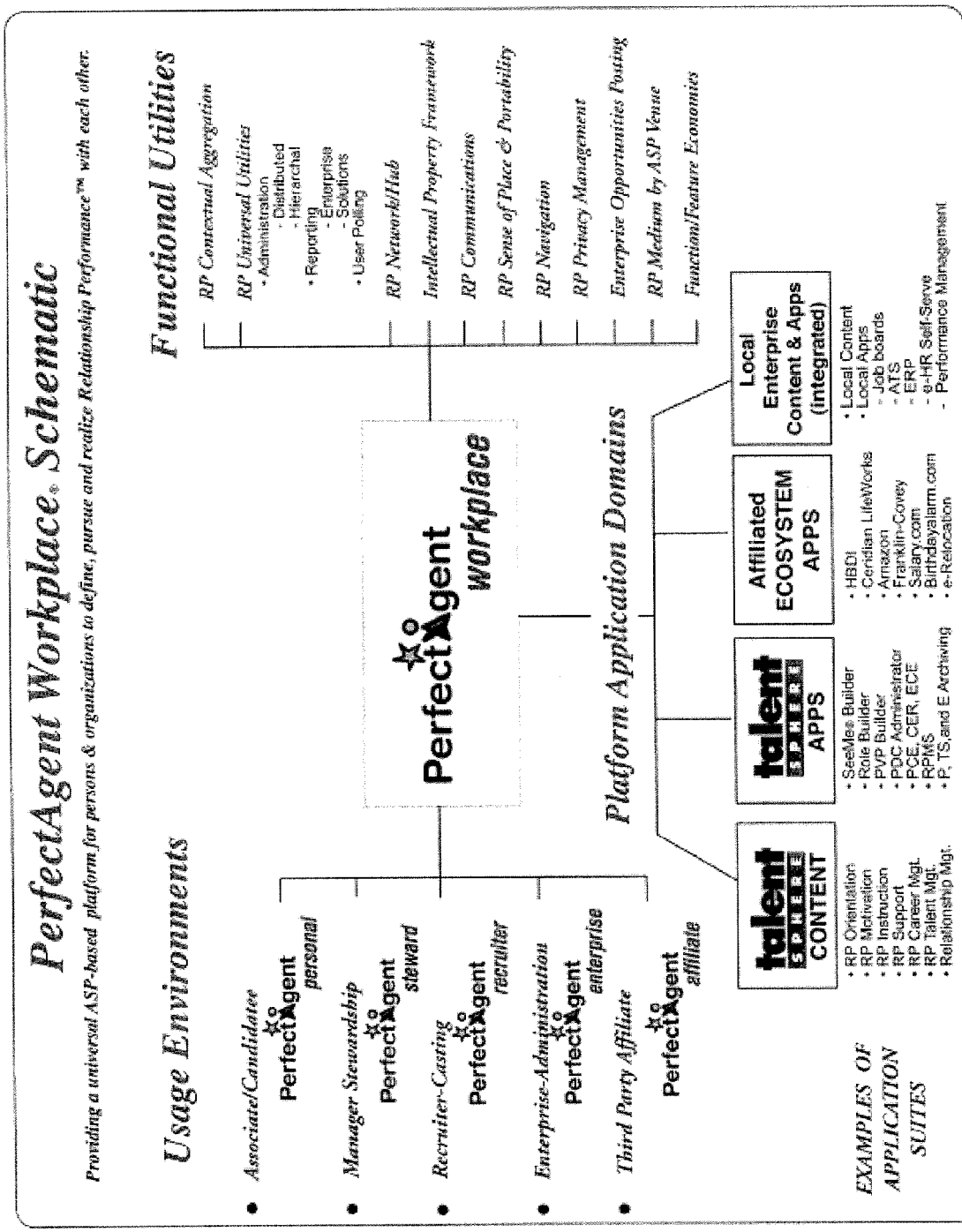
FIG. 25 is a schematic of the PerfectAgent Workplace in accordance with one embodiment of the subject invention.

FIG. 25 shows a diagram of a PerfectAgent Workplace (PAW) model for use with talent stewardship. In one exemplary embodiment, the PAW system is implemented in a web environment, for easy access by users.

Figure 26:
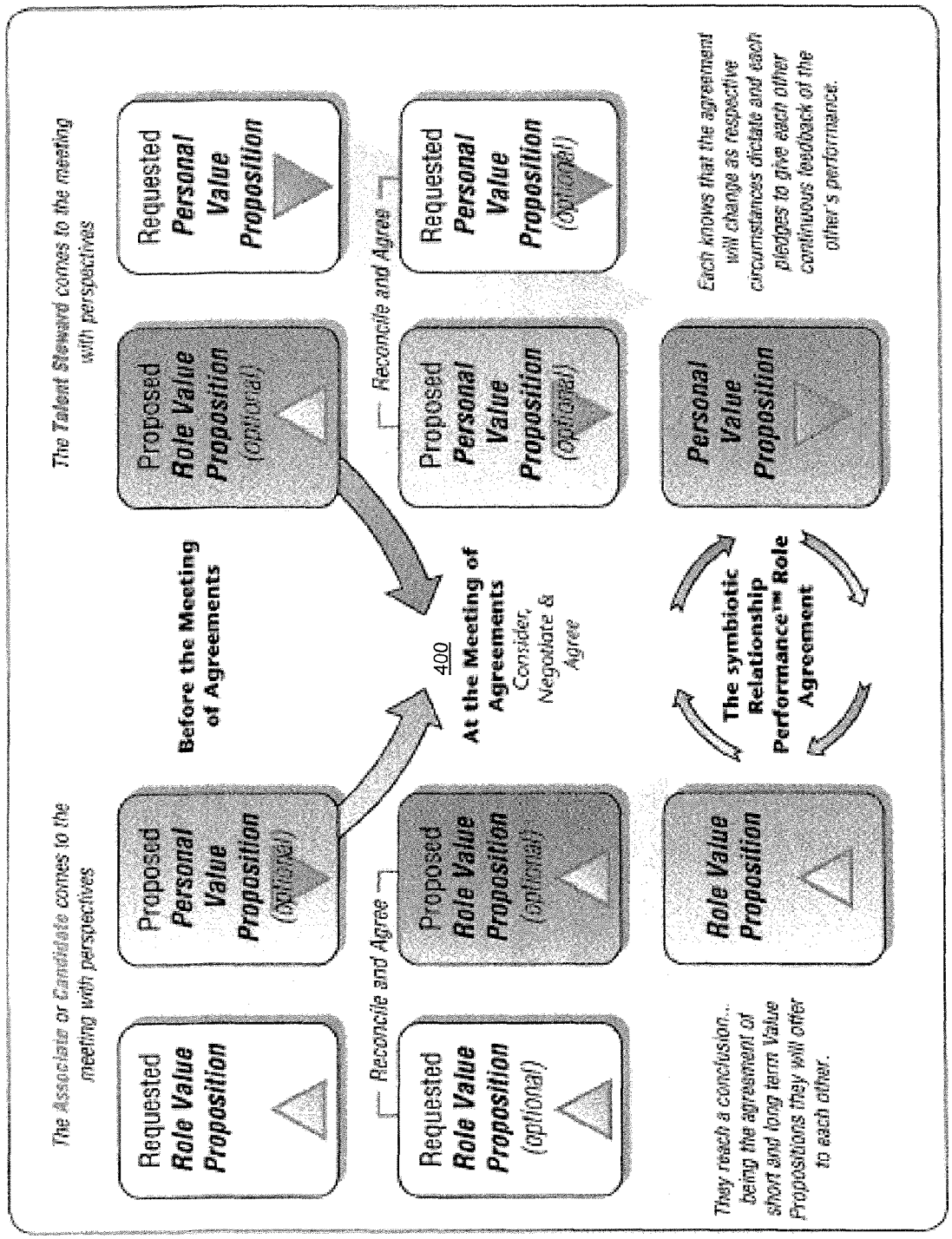
FIG. 26 is a diagram showing the Meeting of Agreements in accordance with one embodiment of the subject invention.

As an initial step, as shown in FIG. 26, stewards may have a face-to-face "Meeting of Agreements" 400 with the associate or individual, to discuss the role and reach agreements on respective value propositions. Ideally, two initial agreements should be resolved: reciprocal and mutual agreement of relationship performance principles; and reciprocal agreement for the role, understanding of the role's Organizational Triangle definition of success, and the Personal Triangle definition of fulfillment that has been reached (the "Role Agreement").

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

I claim:

1. A computer program for managing work role yields, comprising:
    computer-readable media comprising program instructions which when executed by a computer processor provides a user with a personal triangle framework, said framework comprising a visual representation on a computer monitor or viewing device of a triangle with three areas,
        a first area comprising information about how and what an individual provides, performs, produces and operates within his or her work role's central function and purpose,
        a second area comprising information about the community, ecosystem, social factors, and environmental factors of the work role and life at work for the individual, and
        a third area comprising information about the other parts, priorities and influences of the balance of the individual's life external to work roles and the workplace;
    a data input module for the user to input information into the first area, second area, third area, or combination thereof; and
    a database for storing the information input by the user;
    computer-readable media comprising second program instructions which when executed by a computer processor provides the user with an organizational triangle framework, said framework comprising a visual representation on a computer monitor or viewing device of a triangle with three areas,
        a first area comprising information about the outcomes and results desired by an organization for a particular work role,
        a second area comprising information about the resources required for a particular work role, and
        a third area comprising information about risk relating to or concerning the work role and decisions about the work role and individuals in the work role;
    further wherein the second program instructions when executed carry out the following steps:
    creating a database file for a discrete work role, said database file comprising work role management information;
    creating a work role yields file, said work role yields file comprising yields information for one or more yields that a user wishes to gain or avoid for the discrete work role;
    for each yield in the work role yields file, identifying functions to be performed to ensure that that yield is realized or avoided;
    for each function identified, identifying utilization parameters for that function;
    identifying personal capabilities and qualities suited for an identified function; and
    automatically comparing a candidate's personal capabilities and qualities to the personal capabilities and qualities for at least one identified function;
    wherein the steps of identifying utilization parameters for that function and identifying personal capabilities and qualities suited for an identified function are iteratively repeated, with the utilization parameters being modified based on the personal capabilities and qualities identified in the previous iteration, and personal capabilities and qualities being modified based on the utilization parameters identified in the previous iteration.

2. The program of claim 1, wherein the first, second and third areas as displayed are equal in size.

3. The program of claim 1, wherein the information contained in each area is organized into up to three categories, depending upon importance.

4. The program of claim 1, where the information in each of the three areas of the organizational triangle include time, bias and space factors.

5. The program of claim 1, wherein the first areas of the personal triangle and organizational triangle are maximized.

6. The program of claim 1, wherein the personal triangle and organizational triangle frameworks are displayed as joined at a respective corner to form a role-relationship framework in the shape of a bow-tie.

7. The program of claim 1, wherein the organizational triangle framework is contained within the personal triangle framework.

8. The method of claim 1, wherein the utilization parameters for a function are what an employer must provide for an employee to perform the discrete work role.

9. The method of claim 1, wherein the comparison is to the total personal capabilities and qualities for all identified functions.

10. The method of claim 1, wherein a candidate is identified as capable or not-capable for the work role based on the results of the comparison.

11. The method of claim 1, wherein a single person is responsible for managing a discrete work role.

12. The method of claim 1, wherein yields are selected to meet the work role's purposes and objectives.

13. The method of claim 1, wherein yields are not part of another work role.

14. The method of claim 1, wherein each function is allocated a percentage of time within a determined period of time.

15. The method of claim 14, wherein the determined period of time is a day, a week, or a month.

* * * * *